United States Patent [19]

Lu et al.

[11] Patent Number: 5,819,260
[45] Date of Patent: *Oct. 6, 1998

[54] PHRASE RECOGNITION METHOD AND APPARATUS

[75] Inventors: Xin Allan Lu, Springboro; David James Miller, Dayton; John Richard Wassum, Springboro, all of Ohio

[73] Assignee: Lexis-Nexis, Miamisburg, Ohio

[*] Notice: This patent issued on a continued prosecution application filed under 37 CFR 1.53(d), and is subject to the twenty year patent term provisions of 35 U.S.C. 154(a)(2).

[21] Appl. No.: 589,468

[22] Filed: Jan. 22, 1996

[51] Int. Cl.$^6$ .................................................. G06F 17/30
[52] U.S. Cl. ......................... 707/3; 707/1; 707/4; 707/5
[58] Field of Search .................................... 395/604, 603, 395/605, 600, 602; 707/3, 1, 4, 5

[56] References Cited

U.S. PATENT DOCUMENTS

| | | | |
|---|---|---|---|
| 4,864,502 | 9/1989 | Kucera et al. ................................ | 704/8 |
| 4,868,750 | 9/1989 | Kucera et al. ................................ | 704/8 |
| 4,914,590 | 4/1990 | Loatman et al. ............................. | 704/8 |
| 4,931,936 | 6/1990 | Kugiyama et al. ........................... | 704/4 |
| 4,994,966 | 2/1991 | Hutchins ..................................... | 704/9 |
| 5,123,103 | 6/1992 | Othaki et al. ................................ | 707/5 |
| 5,146,405 | 9/1992 | Church ........................................ | 704/9 |
| 5,161,105 | 11/1992 | Kugimiya et al. ........................... | 704/4 |
| 5,225,981 | 7/1993 | Yokogawa .................................... | 704/2 |
| 5,251,316 | 10/1993 | Anick et al. .............................. | 707/101 |
| 5,265,065 | 11/1993 | Turtle ........................................ | 707/4 |
| 5,287,278 | 2/1994 | Rau ............................................ | 704/1 |
| 5,289,375 | 2/1994 | Fukumochi et al. ......................... | 704/2 |
| 5,297,042 | 3/1994 | Morita ........................................ | 707/5 |
| 5,299,124 | 3/1994 | Fukumochi et al. ......................... | 704/2 |
| 5,410,475 | 4/1995 | Lu et al. ..................................... | 704/1 |
| 5,418,948 | 5/1995 | Turtle ........................................ | 707/4 |
| 5,481,742 | 1/1996 | Worley et al. ..................... | 395/200.76 |
| 5,488,725 | 1/1996 | Turtle ........................................ | 707/5 |

OTHER PUBLICATIONS

Salton et al., "A Simple Syntactic Approach for the Generation of Indexing Phrases", Technical Report, Department of Computer Science, Cornell University, Ithaca, New York, pp. 1–8 (note this reference is cited on form PTO 1449), Jul. 1990.

Salton, Gerard, et al., "A Simple Syntactic Approach for the Generation of Indexing Phrases", Technical Report, Department of Computer Science, Cornell University, Ithaca, New York, Jul. 1990.

Coates–Stephens, Sam, "The Analysis and Acquisition of Proper Names for the Understanding of Free Text", *Computers and the Humanities,* Kluwer Academic Publishers, the Netherlands, vol. 26, pp. 441–456, 1993.

Evans, David A., et al., "Automatic Indexing Using Selective NLP and First Order Thesauri", *Intelligent Text and Image Handling, Proceedings of a Conference on Intelligent Text and Image Handling 'RIAO 91'*, Barcelona, Spain, Apr. 1991.

(List continued on next page.)

*Primary Examiner*—Thomas G. Black
*Assistant Examiner*—Greta L. Robinson
*Attorney, Agent, or Firm*—Reid & Priest LLP

[57] ABSTRACT

A phrase recognition method breaks streams of text into text "chunks" and selects certain chunks as "phrases" useful for automated full text searching. The phrase recognition method uses a carefully assembled list of partition elements to partition the text into the chunks, and selects phrases from the chunks according to a small number of frequency based definitions. The method can also incorporate additional processes such as categorization of proper names to enhance phrase recognition. The method selects phrases quickly and efficiently, referring simply to the phrases themselves and the frequency with which they are encountered, rather than relying on complex, time-consuming, resource-consuming grammatical analysis, or on collocation schemes of limited applicability, or on heuristical text analysis of limited reliability or utility.

30 Claims, 6 Drawing Sheets

OTHER PUBLICATIONS

Ahlswede, Thomas, et al., "Automatic Construction of a Phrasal Thesaurus for an Information Retrieval System from a Machine Readable Dictionary", *Proceedings of RIAO '88*, Cambridge, Massachusetts, Mar. 1988, pp. 597–608.

Chruch, Kenneth Ward, et al. (Bell Laboratories), "A Stochastic Parts Program and Noun Phrases Parser for Unrestricted Text", *Proceedings of 1989 International Conference on Acoustics, Speech and Signal Processing* (IEEE Cat. No. 89CH2673–2), Glasgow, Scotland, UK, May 1989, pp. 695–698.

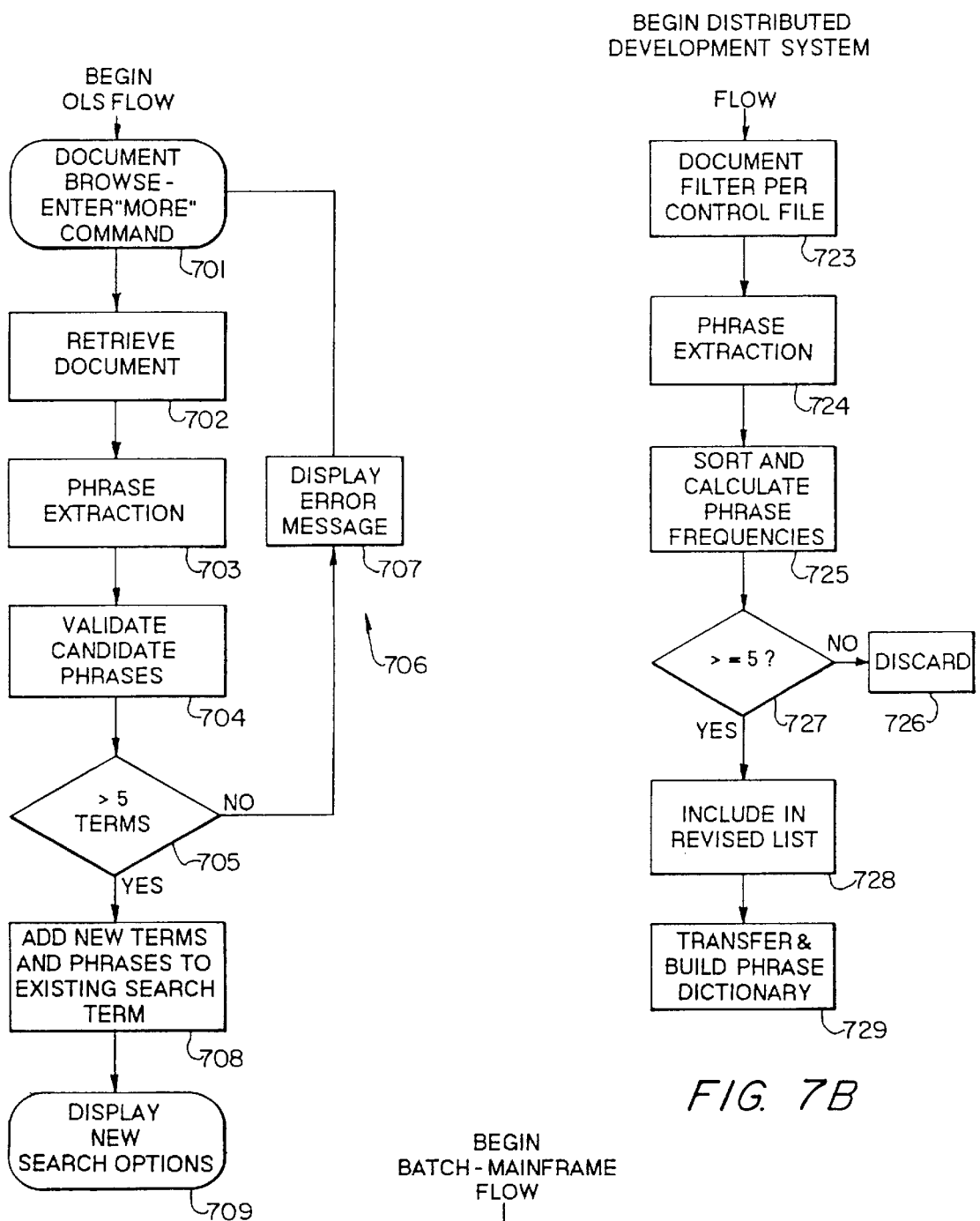
FIG. 7A
FIG. 7B
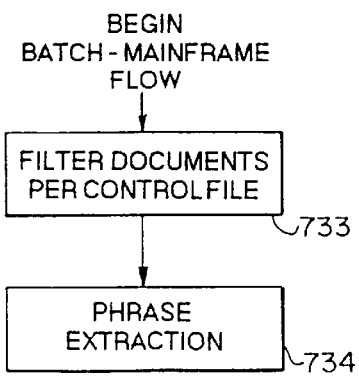
FIG. 7C

PHRASE RECOGNITION METHOD AND APPARATUS

COPYRIGHT NOTICE: A portion of the disclosure (including all Lists) of this patent document contains material which is subject to copyright protection. The copyright owner has no objection to the facsimile reproduction by anyone of the patent document or the patent disclosure as it appears in the U.S. Patent and Trademark Office patent file or records, but the copyright owner reserves all other copyright rights whatsoever.

BACKGROUND OF THE INVENTION

1. Field of the Invention

The present invention relates to automated indexing of full-text documents to identify the content-bearing terms for later document retrieval. More specifically, the invention relates to computer-automated identification of phrases which are useful in representing the conceptual content of documents for indexing and retrieval.

2. Related Art

A type of content-bearing term is the "phrase", a language device used in information retrieval to improve retrieval precision. For example, the phrase "product liability" indicates a concept that neither of the two component words can fully express. Without this phrase, a retrieval process is unable to find the documents in which the concept is discussed.

In traditional Boolean retrieval systems, phrase recognition is not an issue. The systems are known as post-coordination indexing systems in that phrases can be discovered through examining the adjacency relationships among search words during the process of merging inverted lists associated with the words.

However, in modern information retrieval systems, the statistical distribution characteristics of index terms are crucial to the relevance ranking process, and it is desirable to recognize phrases and derive their statistical characteristics in advance. In addition, in fabricating hypertext databases, recognized phrases are necessary for hypertext linkage.

Known phrase recognition methods include three types: machine translation, statistical text analysis and heuristical text analysis.

First, machine translation's approach to recognizing phrases (known as compound structures) is to analyze part-of-speech tags associated with the words in an input text string, usually a sentence. Noun phrases and verb phrases are two examples of such phrases. Syntactical context and lexical relationships among the words are key factors that determine successful parsing of the text. In machine translation, the goal is not of finding correct phrases, but of discovering the correct syntactical structure of the input text string to support other translation tasks. It is infeasible to use this syntactical parsing method for processing commercial full-text databases; the method is inefficient and is in practical terms not scalable. Regarding machine translation, reference may be made to U.S. Pat. Nos. 5,299,124, 5,289,375, 4,994,966, 4,914,590, 4,931,936, and 4,864,502.

The second method of analysis, statistical text analysis, has two goals: disambiguating part of speech tagging, and discovering noun phrases or other compound terms. The statistics used include collocation information or mutual information, i.e., the probability that a given pair of part-of-speech tags or a given pair of words tends to appear together in a given data collection. When a word has more than one part-of-speech tag associated with it in a dictionary, consulting the part of speech of the next word and calculating the probability of occurrence of the two tags would help select a tag. Similarly, a pair of words that often appear together in the collection is probably a phrase. However, statistical text analysis requires knowledge of collocation that can only be derived from an known data collection. Disadvantageously, the method is not suitable for processing unknown data. Regarding statistical text analysis, reference may be made to U.S. Pat. Nos. 5,225,981, 5,146,405, and 4,868,750.

The third method of analysis, heuristical text analysis, emphasizes textual pattern recognition. Textual patterns include any recognizable text strings that represent concepts, such as company names, peoples' names, or product names. For example, a list of capital words followed by a company indicator like "Limited" or "Corp" is an example pattern for recognizing company names in text. The heuristical text analysis method requires strong observation ability from a human analyst. Due to the limitation of humans' observation span, heuristical text analysis is only feasible for small subject domains (e.g., company name, product names, case document names, addresses, etc.). Regarding heuristical text analysis, reference may be made to U.S. Pat. Nos. 5,410,475, 5,287,278, 5,251,316, and 5,161,105.

Thus, machine translation methods, involving potentially complex grammatical analysis, are too expensive and too error-prone for phrase recognition. Statistical text analysis, being based on collocation and being purely based on statistics, is still expensive because of the required full scale of part-of-speech tagging and pre-calculating collocation information, and also has difficulties processing unknown data without the collocation knowledge. Finally, heuristical text analysis, relying on "signal terms", is highly domain-dependent and has trouble processing general texts.

Thus, there is a need in the art for a simple, time-efficient, resource-efficient, and reliable phrase recognition method for use in assisting text indexing or for forming a statistical thesaurus. It is desired that the phrase recognition method be applicable to both individual documents and to large collections of documents, so that the performance of not only real-time on-line systems, but also distributed and mainframe text search systems can be improved. It is also desired that the phrase recognition method have engineering scalability, and not be limited to particular domains of knowledge.

The present invention is directed to fulfilling these needs.

SUMMARY OF THE INVENTION

The present invention provides a phrase recognition method which breaks text into text "chunks" and selects certain chunks as "phrases" useful for automated full text searching. The invention uses a carefully assembled list of partition words to partition the text into the chunks, and selects phrases from the chunks according to a small number of frequency-based definitions. The invention can also incorporate additional processes such as categorization of proper names to enhance phrase recognition.

The invention achieves its goals quickly and efficiently, referring simply to the phrases and the frequency with which they are encountered, rather than relying on complex, time-consuming, resource-consuming grammatical analysis, or on collocation schemes of limited applicability, or on heuristical text analysis of limited reliability or utility.

Additional objects, features and advantages of the invention will become apparent when the following Detailed Description of the Preferred Embodiments is read in conjunction with the accompanying drawings.

BRIEF DESCRIPTION OF THE DRAWINGS

The invention is better understood by reading the following Detailed Description of the Preferred Embodiments with reference to the accompanying drawing figures, in which like reference numerals refer to like elements throughout, and in which:

FIGS. 7A, 7B and 7C illustrate exemplary applications of the inventive phrase recognition method according to the present invention. In particular: FIG. 7A indicates a user's viewing of a document in accordance with a suitable on-line text search system, and invoking the inventive phrase recognition method to search for additional documents of similar conceptual content; FIG. 7B schematically illustrates implementation of the phrase recognition method in a batch phrase recognition system in a distributed development system; FIG. 7C schematically illustrates application of the inventive phrase recognition method in a batch process in a mainframe system.

DETAILED DESCRIPTION OF THE PREFERRED EMBODIMENTS

Figure 1:
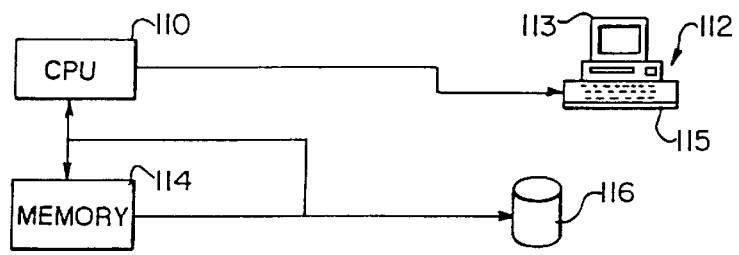
FIG. 1 illustrates an exemplary hardware configuration on which the inventive phrase recognition method may be executed.

In describing preferred embodiments of the present invention illustrated in the drawings, specific terminology is employed for the sake of clarity. However, the invention is not intended to be limited to the specific terminology so selected, and it is to be understood that each specific element includes all technical equivalents which operate in a similar manner to accomplish a similar purpose.

The concept of the present invention is first described on a particular example of a text stream. Then, block diagrams and flow charts are described, which illustrate non-limiting embodiments of the invention's structure and function.

Very briefly, a preferred embodiment of the inventive method partitions an input text stream based on punctuation and vocabulary. As the method processes the text stream sequentially, it inserts partition symbols between words if certain punctuation exists, such as a comma, end of sentence, or change in capitalization. Further, each word encountered is checked against one or more vocabulary lists, and may be discarded and replaced by a partition symbols, based on the word and where it is encountered.

After the document is thus processed, a set of candidate terms and "phrases" (a series of non-partitioned words) is produced. In the preferred embodiment, solitary words (individual words immediately surrounded by partitions) are ignored at this point. The phrases are processed to determine which phrases occur with higher frequency. Preferably, shorter phrases which occur with higher frequency and as subsets of lower-frequency but lengthier phrases are also sought. A set of phrases meeting or exceeding a given threshold frequency is produced.

The inventive method is more easily understood with reference to a particular example.

As mentioned above, members of a list of words (including punctuation) serve as "break points" to form text "chunks" within input text. A first (rudimentary) list includes words can be used as "stop words". The stop words usually carry little semantic information because they exist merely for various language functions. This list has a few hundred members and includes articles (e.g., "a", "the"), conjunctions (e.g., "and", "or"), adverbs (e.g., "where", "why"), prepositions (e.g., "of", "to", "for"), pronouns (e.g., "we", "his"), and perhaps some numeric items.

However, this first list is too short for the present phrase recognition method because it causes generation of a list of text chunks that are too long to allow efficient generation of desirable phrases. Additional stop words or other partition items are needed for reducing the size of the text chunks, so that more desirable phrases may be found.

The following example of text illustrates this problem. In this example, the text "chunks" are within square brackets, with the text chunks being separated by an members of the list of stop words (break points):

[Citing] what is [called newly conciliatory comments] by the [leader] of the [Irish Republican Army]'s [political wing], the [Clinton Administration announced today] that it would [issue] him a [visa] to [attend] a [conference] on [Northern Ireland] in [Manhattan] on [Tuesday]. The [Administration] had been [leaning] against [issuing] the [visa] to the [official], [Gerry Adams], the [head] of [Sinn Fein], [leaving] the [White House caught] between the [British Government] and a [powerful bloc] of [Irish-American legislators] who [favored] the [visa]. (Parsed text based on rudimentary list)

Since desirable phrases include noun phrases (e.g., "ice cream"), adjective-noun phrases (e.g., "high school"), participle-noun phrases (e.g., "operating system"), and proper names (e.g., "White House"), it is safe to add adverbs (e.g., "fully") and non-participle verbs (e.g., "have", "is", "obtain") to the list of stop words to form an enhanced stop word list. This enhanced stop word list allows the method to provide smaller text chunks, yet is still compact enough for efficient look-up by computer. With the enhanced list, the above example text is parsed into chunks and stop words as follows:

[Citing] what is [called] newly [conciliatory comments] by the [leader] of the [Irish Republican Army]'s

[political wing], the [Clinton Administration] announced [today] that it would issue him a [visa] to attend a [conference] on [Northern Ireland] in [Manhattan] on [Tuesday]. The [Administration] had been [leaning] against [issuing] the [visa] to the [official], [Gerry Adams], the [head] of [Sinn Fein], [leaving] the [White House] caught between the [British Government] and a [powerful bloc] of [Irish-American legislators] who favored the [visa]. (Second parsed text based on enhanced list)

The theoretical justification of using this enhanced list derives from two sources.

A first justification is that this list only represents about 13% of unique words in a general English dictionary. For example, in the Moby dictionary of 214,100 entries, there are 28,408 words that can be put into the list. This fact ensures that semantic, information in texts is maintained at a maximum level.

A second justification involves the lexical characteristics of these words. Most of the words bear little content. This second fact reduces the risk of losing semantic information in the text.

The basic concept of the invention having been described, particular implementations of its structure and function are now presented.

As will readily be appreciated, the invention is preferably embodied as software, instruction codes capable of being executed by digital computers, including commercially available general purpose digital computers well known to those skilled in the art. The particular hardware on which the invention may be implemented varies with the particular desired application of the inventive phrase recognition method. Three examples of the such application of the phrase recognition method are described in greater detail below, with reference to FIGS. 7A, 7B, and 7C. Briefly, the dynamic recognition method involved in an on-line system (FIG. 7A) may be implemented in IBM 370 assembly language code. Alternatively, in a batch recognition system in a distributed development system (FIG. 7B), the phrase recognition method may be implemented on a SUN work station using the PERL script interpretive prototyping language. As a still further implementation, the inventive phrase recognition method may be implemented on an Amdahl AMD 5995-1400-a mainframe so that another batch phrase recognition system (FIG. 7C) may be realized. Of course, the scope of the invention should not be limited by these exemplary embodiments or applications.

Embodiments of the inventive phrase recognition method may be implemented as a software program including a series of executable modules on a computer system. As shown in FIG. 1, an exemplary hardware platform includes a central processing unit 110. The central processing unit interacts with a human user through a user interface 112. The user interface is used for inputting information into the system and for interaction between the system and the human user. The user interface 112 includes, for example, a video display 113 and a keyboard 115. A computer memory 114 provides storage for data and software programs which are executed by the central processing unit 110. Auxiliary memory 116, such as a hard disk drive or a tape drive, provides additional storage capacity and a means for retrieving large batches of information.

All components shown in FIG. 1 are of a type well known in the art. For example, the FIG. 1 system may include a SUN® work station including the execution platform Sparc 2 and SUN OS Version 4.1.2., available from SUN MICROSYSTEMS of Sunnyvale, Calif. Of course, the system of the present invention may be implemented on any number of modern computer systems.

Figure 2:
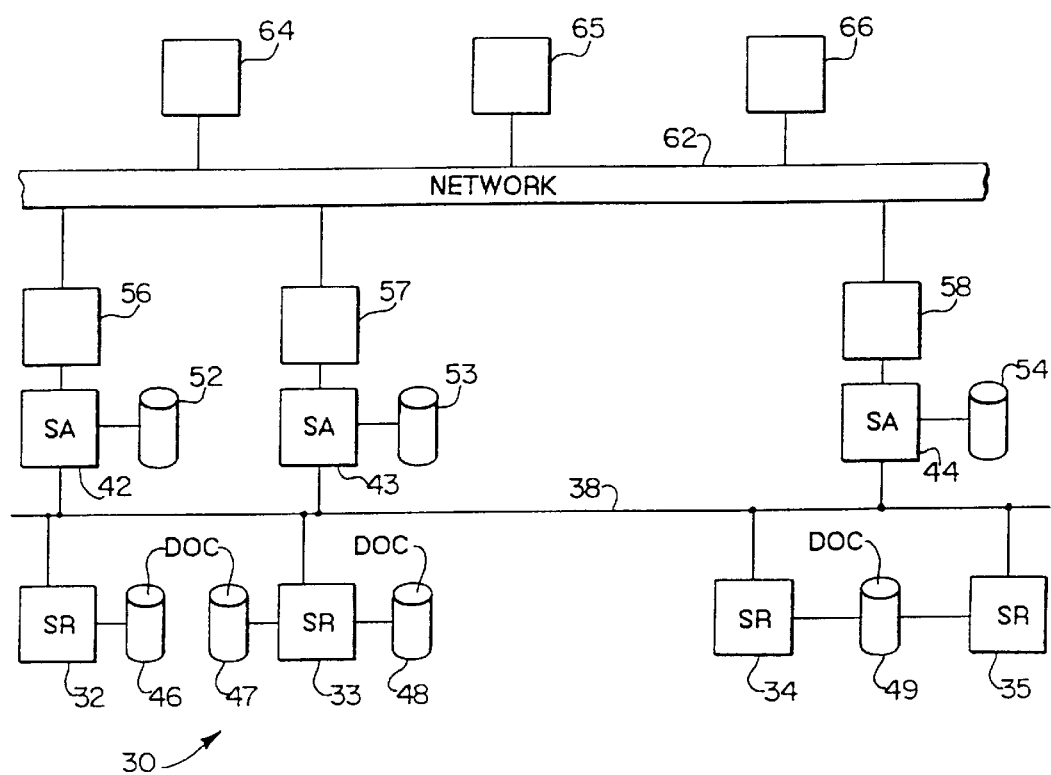
FIG. 2 illustrates another exemplary hardware environment in which the inventive phrase recognition method may be practiced.

A second, more complex environment in which the inventive phrase recognition method may be practiced is shown in FIG. 2. In particular, a document search and retrieval system 30 is shown. The system allows a user to search a subset of a plurality of documents for particular key words or phrases. The system then allows the user to view documents that match the search request. The system 30 comprises a plurality of Search and Retrieval (SR) computers 32–35 connected via a high speed interconnection 38 to a plurality of Session Administrator (SA) computers 42–44.

Each of the SR's 32–35 is connected to one or more document collections 46–49, each containing text for a plurality of documents, indexes therefor, and other ancillary data. More than one SR can access a single document collection. Also, a single SR can be provided access to more than one document collection. The SR's 32–35 can be implemented using a variety of commercially available computers well known in the art, such as Model EX100 manufactured by Hitachi Data Systems of Santa Clara, Calif.

Each of the SA's 42–44 is provided access to data representing phrase and thesaurus dictionaries 52–54. The SA's 42–44 can also be implemented using a variety of commercially available computers, such as Models 5990 and 5995 manufactured by Amdahl Corporation of Sunnyvale Calif. The interconnection 38 between the SR's and the SA's can be any one of a number of two-way high-speed computer data interconnections well known in the art, such as the Model 7200-DX manufactured by Network Systems Corporation of Minneapolis, Minn.

Each of the SA's 42–44 is connected to one of a plurality of front end processors 56–58. The front end processors 56–58 provide a connection of the system 30 one or more commonly available networks 62 for accessing digital data, such as an X.25 network, long distance telephone lines, and/or SprintNet. Connected to the network 62 are plural terminals 64–66 which provide users access to the system 30. Terminals 64–66 can be dumb terminals which simply process and display data inputs and outputs, or they can be one of a variety of readily available stand-alone computers, such as IBM or IBM-compatible personal computers. The front end processors 56–58 can be implemented by a variety of commercially available devices, such as Models 4745 and 4705 manufactured by the Amdahl Corporation of Sunnyvale Calif.

The number of components shown in FIG. 2 are for illustrative purposes only. The system 30 described herein can have any number of SA's, SR's, front end processors, etc. Also, the distribution of processing described herein may be modified and may in fact be performed on a single computer without departing from the spirit and scope of the invention.

A user wishing to access the system 30 via one of the terminals 64–66 will use the network 62 to establish a connection, by means well known in the art, to one of the front end processors 56–58. The front end processors 56–58 handle communication with the user terminals 64–66 by providing output data for display by the terminals 64–66 and by processing terminal keyboard inputs entered by the user. The data output by the front end processors 56–58 includes text and screen commands. The front end processors 56–58 support screen control commands, such as the commonly known VT100 commands, which provide screen functionality to the terminals 64–66 such as clearing the screen and moving the cursor insertion point. The front end processors 56–58 can handle other known types of terminals and/or stand-alone computers by providing appropriate commands.

Each of the front end processors 56–58 communicates bidirectionally, by means well known in the art, with its corresponding one of the SA's 42–44. It is also possible to configure the system, in a manner well known in the art, such that one or more of the front end processors can communicate with more than one of the SA's 42–44. The front end processors 56–58 can be configured to "load balance" the SA's 42–44 in response to data flow patterns. The concept of load balancing is well known in the art.

Each of the SA's 42–44 contains an application program that processes search requests input by a user at one of the terminals 64–66 and passes the search request information onto one or more of the SR's 32–35 which perform the search and returns the results, including the text of the documents, to the SA's 42–44. The SA's 42–44 provide the user with text documents corresponding to the search results via the terminals 64–66. For a particular user session (i.e. a single user accessing the system via one of the terminals 64–66), a single one of the SA's 42–44 will interact with a user through an appropriate one of the front end processors 56–58.

Preferably, the inventive phrase recognition method is implemented in the session administrator SA computers 42–44, with primary memory being in the SA computer itself and further memory being illustrated within elements 52–54.

The principles on which the inventive method is based, and hardware systems and software platforms on which it may be executed, having been described, a preferred embodiment of the inventive phrase recognition method is described as follows.

Figure 3:
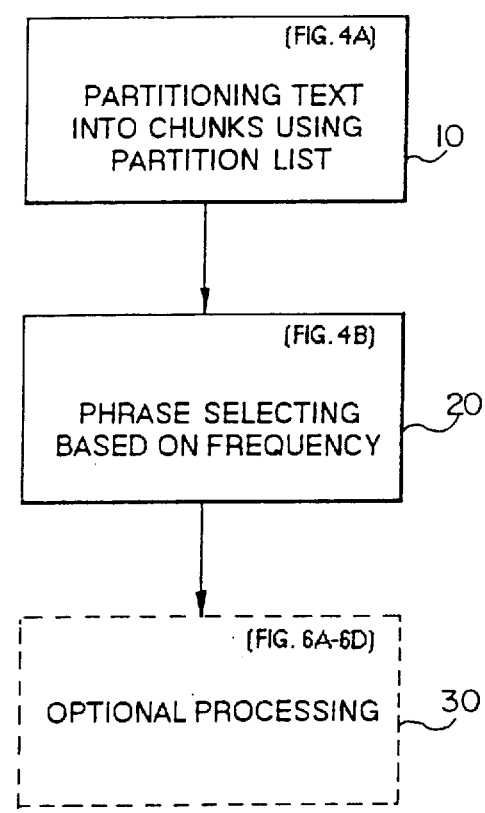
FIG. 3 is a high level flow chart schematically indicating execution in an embodiment of the phrase recognition method according to the present invention.

FIG. 3 is a high level flow diagram of the phrase recognition method of the preferred embodiment.

Referring to FIG. 3, the invention uses a carefully assembled list of English words (and other considerations such as punctuation) in a Partition Word List (more generally referred to as a Partition Entity List, or simply Partition List) to partition one or more input text streams into many text chunks. This partitioning process is illustrated in block 10.

Block 20 indicates selection of phrases from among the chunks of text, according to frequency based definitions. A Phrase List, including the selected phrases, results from execution of the process in block 20. During the phrase selection process, solitary words (single-word chunks), as well as words from the decomposed phrases, can be maintained separate from the Phrase List as optional outputs for other indexing activities.

Details of processes 10 and 20 are described with reference to FIGS. 4A and 4B.

The invention can optionally incorporate one or more other processes, generically indicated as element 30. Such optional process may include categorization (examples described with reference to FIGS. 6A–6D) to enhance the list of recognized phrases.

Figure 4A:
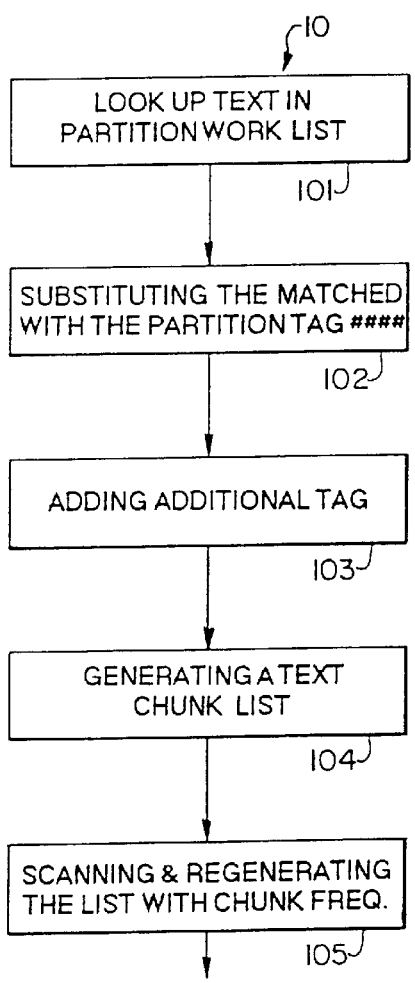
FIG. 4A is a flow chart schematically indicating execution in a module for partitioning text and generating text chunks.

FIG. 4A is a flow chart of FIG. 3 module 10, for partitioning text and generating text chunks.

FIG. 4A shows how the method, given a piece of text, partitions the text into many small text chunks. A critical component in this method is the Partition List (including words and punctuation) whose members serve as break points to generate the text chunks.

As mentioned above, a Partition List ideally allows parsing of text into short phrases, but is itself still compact enough for efficient computer look-up during the parsing process. Preferably, the Partition List is generated using not only articles, conjunctions, adverbs, prepositions, pronouns, and numeric items, but also adverbs and verbs, to form an enhanced list.

The text partitioning process starts off with looking up encountered text in the Partition List (at block 101) and replacing every matched partition word or other partition entity with a partition tag such as "####" (shown at block 102).

Additional partition tags are added into those text chunks at the point where there is a case change, either from lower case to upper case or vice versa (shown at block 103). Block 104 indicates generation of the text chunk list which preserves the natural sequence of the chunks as encountered in the text.

The frequency information for each chunk in the list is collected by scanning the text chunks in their natural sequence. The first occurrence of each unique chunk in the sequence is registered as a new entry with its frequency as 1. Subsequent occurrences are registered by incrementing its frequency count by 1. This generation of occurrence frequencies in association with the respective chunks is indicated by block 105.

Figure 4B:
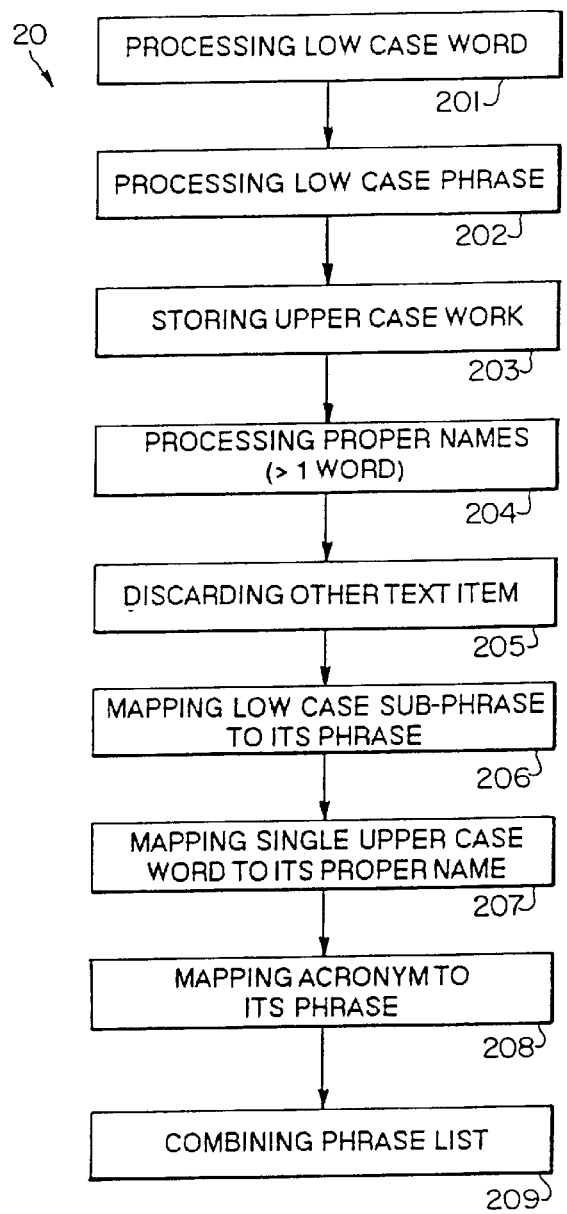
FIG. 4B is a flow chart indicating execution of a module for selecting phrases using the data memory structure diagram of FIG. 5.

FIG. 4B is a flow chart of FIG. 3 module 20, illustrating details of a preferred process for selecting which chunks are phrases.

Figure 5:
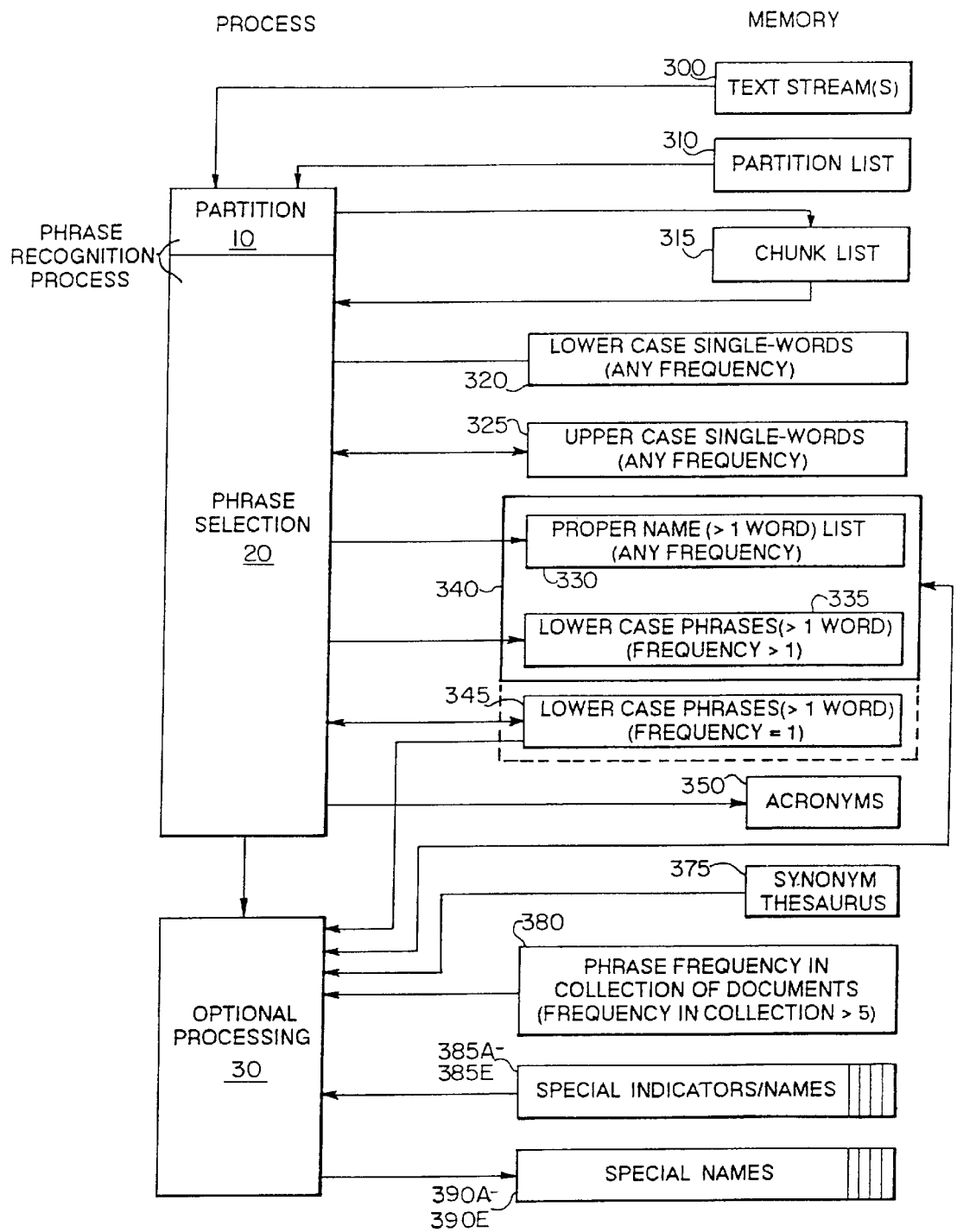
FIG. 5 is a data memory structure diagram schematically illustrating data flow during the inventive phrase recognition method (FIGS. 3, 4A, 4B) and corresponding memory allocation for various types of data used in accordance with the process.

FIG. 5 is a data memory structure diagram showing how data may be arranged in memory for the process, and how data flows into and out of various steps of the process. More specifically, the steps from FIG. 3 of text partitioning 10, phrase selection 20, and optional processing 30 (reproduced on the left side of FIG. 5) are illustrated in conjunction with an exemplary data memory structure diagram (on the right side of FIG. 5) to schematically illustrate data flow between major functional procedures and data structures. The various lists shown in the exemplary memory blocks on the right side of FIG. 5 are understood to include list members in conjunction with their respective frequencies of occurrence.

The memory (broadly, any data storage medium such as RAM and/or magnetic disk and/or optical disk and/or other suitable computer readable medium) may be structured in memory blocks as schematically illustrated. A text stream file 300 and a Partition List 310 are used as inputs to the partitioning process 10 of the inventive phrase recognition method. The partitioning process 10 provides a chunk list (understood as including corresponding chunk frequencies) 315. Chunk list 315 is used by the phrase selection process 20 of the inventive phrase recognition method.

The partitioning process produces various groupings of chunks, each with their respective frequencies of occurrence within the text stream. These groupings of chunks are illustrated on the right side of FIG. 5, with the understanding that the invention should not be limited to the particular memory structure so illustrated.

Specifically, lower case words (that is, single-word chunks) are in memory block 320, capitalized or "allcaps" single-word chunks are in memory block 325, a Proper Name List (preferably of greater than one word, each being capitalized or in allcaps) is in memory block 330, lower case phrases of greater than one word occurring more than once are in memory block 335, lower case phrases of greater than one word which were encountered only once are in memory block 345, and, optionally, acronyms are in memory block 350.

A synonym thesaurus in memory block 375 may be used in an optional process 30. A phrase frequency list derived from a collection of plural documents in which the phrase frequency throughout the collection is greater than a threshold, in memory block 380, may also be used in an optional processing procedure 30. Further, one or more special indicator lists, generally indicated as 385A–385E

(company indicators, geographic names, product names, organization indicators, English first names, respectively, some of which are exemplified in the attached List) may contribute to certain optional categorizing processes, and result in corresponding name lists (company names, geographic location names, product names, organization names, and English names) generally indicated as 390A–390E.

Referring again to FIG. 4B, after the text chunk list is produced, it is the time to make decision whether each chunk in the list is a phrase useful for representing conceptual content of documents. The inventive phrase recognition method uses the frequency information of two types of the partitioned text chunks (namely, the proper names in block 330 and the lower case phrases in blocks 335 and 345) to make final phrase selection decisions. Preferably, the invention focuses on lower case phrases of more than one word, or on proper names ("John Hancock", "United States").

Referring to FIGS. 4B and 5, at block 201, entries consisting of a solitary lower case word are not selected as phrases. Rejected entries are stored in memory block 320.

As shown at block 202, those chunks that include plural lower case words are determined to be phrases only if they occur at least twice in the text stream. These chunks are stored in memory block 335. Chunks not fitting these criteria are stored in block 345 for further processing.

For chunks consisting of a solitary upper case word (either the first letter being capitalized or "allcaps"), no phrase decision is made at this stage, as shown at block 203. Such chunks are stored in memory block 325.

In block 204, chunks including plural upper case words are determined to be proper names and are stored in a Proper Name List in memory block 330.

Finally, other text chunks not fitting the previous criteria are simply discarded at this time, as indicated at block 205.

Next, block 206 examines the lower case phrases having a single occurrence from memory block 245. They are examined for having one of its sub-phrases as part of an existing lower case phrase in the list. For efficiency, a sub-phrase may be defined to be the first or last two or three words in the phrases. When the existence of a sub-phrase is detected, it is merged into the corresponding phrase in the list in memory block 335, and its frequency count is updated. Otherwise, and the lower case phrase is decomposed into individual words for updating the lower case word list in memory block 320 as an optional output.

As a result of this sub-phrase mapping in block 206, in our example the list is reduced to a list of lower case phrases and a list of proper names, both with their respective frequency counts:

[political wing, 2]
[Citing, 1]
[Irish Republican Army, 1]
[Clinton Administration, 1]
[Northern Ireland, 1]
[Manhattan, 1]
[Tuesday, 1]
[Administration, 1]
[Gerry Adams, 1]
[Sinn Fein, 1]
[White House, 1]
[British Government, 1]

The singleton upper case word could be used for referencing an existing proper name in the proper name list. To make the final frequency count accurate, the method makes one additional scan to the Proper Name List 330. It consolidates the upper case word that is either the first or the last word of a previously recognized proper name, and updates its frequency count. This use of upper case single words in memory block 325 to revise the Proper Name List 330 is indicated at block 207. The method stores the other upper case words in the upper case word list 325 as an optional output.

A special case of the singleton upper case word is that of the acronym. An acronym is defined either as a string of the first character of each word (which is neither a preposition nor a conjunction) in a proper name or as a string of the first character of each word in a proper name followed by a period. As indicated at block 208, when an acronym in memory block 325 maps to a proper name in the proper name list 330, the frequency count of the proper name is incremented, and the pair of the proper name and its acronym is copied into an acronym list 350 as an optional output.

In our example, this reference checking process further reduces the proper name list in this example to the following:

[Irish Republican Army, 1]
[Clinton Administration, 2]
[Northern Ireland, 1]
[Gerry Adams, 1]
[Sinn Fein, 1]
[White House, 1]
[British Government, 1]

If no additional processing is necessary, this method concludes by combining the lower case phrase list in memory block 335 and the Proper Name List in memory block 330 into a single Phrase List 340 which is provided as the final output of the phrase selection process 20.

In another embodiment, the lower case phrases with frequency=1 in memory block 345 are also included in the consolidation, in addition to the Proper Name List in memory block 330 and the lower case phrases having frequency greater than 1 in memory block 335. The choice of either including or excluding the lower case phrases in memory block 345 is determined by a frequency threshold parameter which determines the number of times a lower case phrase must be encountered before it is allowed to be consolidated into the final Phrase List.

The example shown in FIG. 5 has this threshold set to 2, so that those phrases encountered only once (in memory block 345) are excluded from the consolidated Phrase List 340. The dotted line extending downward from Phrase List 340 to include memory block 345 shows how lower case phrases encountered only once can be included in the Phrase List if desired, however.

In any event, the consolidation of memory blocks into a single Phrase List is indicated at block 209.

For this text stream example, the final Phrase List is as follows:

[political wing, 2]
[Irish Republican Army, 1]
[Clinton Administration, 2]
[Northern Ireland, 1]
[Gerry Adams, 1]
[Sinn Fein, 1]
[White House, 1]
[British Government, 1]

The invention envisions that optional processes are available for further enhancing the recognized phrases.

Figure 6A:
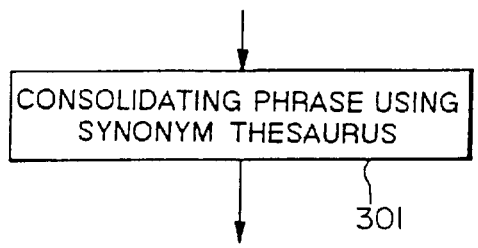
FIG. 6A is a flow chart of an optional processing module for consolidating with a thesaurus.

FIG. 6A is a flow chart of an optional processing module for consolidating with a synonym thesaurus.

Referring to FIG. 6A, the Phrase List can be further reduced with a synonym thesaurus, as indicated at block 301. The synonym thesaurus may be any suitable synonym thesaurus available from commercial vendors. As an example, the Phrase List may map "White House" to "Clinton Administration." Using a synonym thesaurus is risky because its contents may not reflect the intended conceptual content of the text, and therefore may cause mapping errors. For example, it would be problematic if a synonym thesaurus maps "Bill Clinton" to "White House", because the two terms are not always equivalent.

Figure 6B:
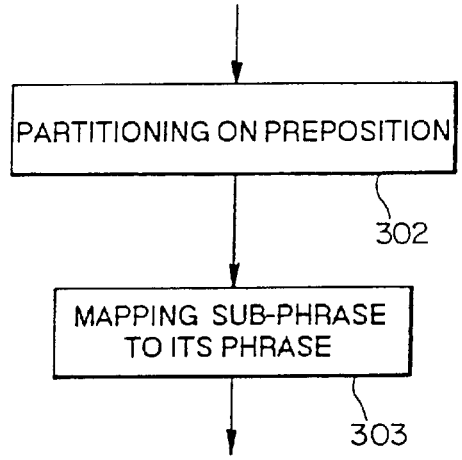
FIG. 6B is a flow chart of an optional processing module for processing phrases with prepositions.

FIG. 6B is a flow chart of an optional processing module for processing phrases with prepositions.

Referring to FIG. 6B, when a desirable lower case phrase contains one of a small set of prepositions (e.g., "right to counsel", "standard of proof"), the method takes the set out of the Partition List used for generating text chunks so that the phrase including the preposition has an opportunity to reveal itself as being part of a "good" phrase. This process is indicated as block 302.

Since it is statistically unlikely that any given occurrence of a preposition is in a "good" phrase, this optional process consumes substantial time for a relatively small increase in phrases, and is considered optional.

It is necessary to have another process to further examine the unqualified phrase in memory block 345 that contains one of the selected prepositions, whether the sub-phrase on the left of the preposition or the sub-phrase on the right constitutes a valid phrase in the lower case phrase list in memory block 335. This process is illustrated as block 303.

As a result of process blocks 302, 303, memory block 335 may be updated.

Figure 6C:
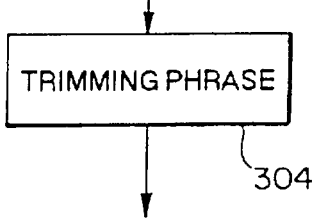
FIG. 6C is a flow chart of an optional processing module for trimming phrases with their collection frequencies.

FIG. 6C is a flow chart of an optional processing module for trimming phrases with their collection frequencies.

Referring to FIG. 6C, still another optional process is that of editing the list of the Proper Name List 330 and lower case phrases 335 with additional frequency information 380 gathered from a text collection of more than one document. The assumption here is that, the more authors which use a phrase, the more reliable the phrase is for uniquely expressing a concept. In other words, a phrase occurring in more than one document is a "stronger" phrase than another phrase occurring only in a single document.

Here, the "collection frequency" of a phrase is the number of documents that contain the phrase. A collection frequency threshold (e.g., five documents) can be set to trim down those phrases whose collection frequencies are below the threshold, as indicated at block 304. Essentially, FIG. 6C trims the entire Phrase List 340, including entries from either memory block 330 or 335.

When collection frequency information is available (as illustrated by memory block 380), the minimum frequency requirement of two encounters for the lower case phrases within a text (see FIG. 5) can be lowered to one encounter. "Mistaken" phrases will be rejected when consulting the collection frequency information when considering multiple documents.

Figure 6D:
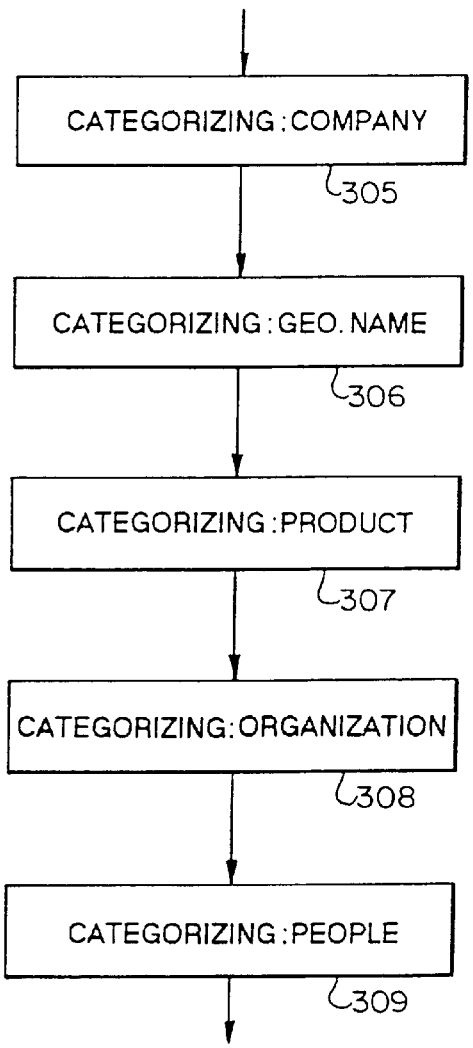
FIG. 6D is a flow chart of an optional processing module for categorizing proper names.

FIG. 6D is a flow chart of an optional processing module for categorizing proper names.

Referring now to FIG. 6D, after proper names are identified and are stored in the Proper Name List 330, it is possible to categorize them into new sets of pre-defined groups, such as company names, geographic names, organization names, peoples' names, and product names.

A list 385A of company indicators (e.g., "Co." and "Limited") is used for determining whether the last word in a proper name is such an indicator, and thereafter for categorizing it into the group of company name. Any word after this indicator is removed from the proper name.

With the knowledge of the company name, it may be useful to check the existence of the same company name in the list that does not have the indicator word. If the search is successful, the frequency count of the company name is updated. The recognized company names are kept in a Company Names list 390A as an optional output, as indicated at block 305.

Similarly, a list 385B of geographic names or a list 385C of product names may be used for looking up whether a proper name has a match and thereafter for categorizing it into the list of geographic names or a list of product names, respectively. The recognized geographic names or product names are kept in Geographic Location Names 390B or Product Names 390C lists as optional outputs, as indicated at blocks 306 and 307.

A list 385D of words that designate organizations is used for determining whether the first or the last word of a proper name is the indicator of organization, and thereafter for categorizing it into the group of organizations. The recognized organization names may be kept in an Organization Names List 390D as an optional output, as indicated at block 308.

Finally a list 385E of English first names is used for determining whether the first word of a proper name is a popular first name and thereafter for categorizing it into the group of peoples' names. Any word before the first name is removed from the proper name. The more comprehensive the lists are, the more people names can be categorized properly. The recognized people names are kept in a separate English Names list 390E as an optional output for other indexing activities, as indicated at block 309.

Appendices A through E present an exemplary Partition List 310 and exemplary Special Indicator/Name lists 385A–385E.

The inventive method having been described above, the invention also encompasses apparatus (especially programmable computers) for carrying out phrase recognition. Further, the invention encompasses articles of manufacture, specifically, computer readable memory on which the computer-readable code embodying the method may be stored, so that, when the code used in conjunction with a computer, the computer can carry out phrase recognition.

Non-limiting, illustrative examples of apparatus which invention envisions are described above and illustrated in FIGS. 1 and 2. Each constitutes a computer or other programmable apparatus whose actions are directed by a computer program or other software.

Non-limiting, illustrative articles of manufacture (storage media with executable code) may include the disk memory 116 (FIG. 1), the disk memories 52–54 (FIG. 2), other magnetic disks, optical disks, conventional 3.5-inch, 1.44 MB "floppy" diskettes or other magnetic diskettes, magnetic tapes, and the like. Each constitutes a computer readable memory that can be used to direct the computer to function in a particular manner when used by the computer.

Those skilled in the art, given the preceding description of the inventive method, are readily capable of using knowledge of hardware, of operating systems and software platforms, of programming languages, and of storage media, to make and use apparatus for phrase recognition, as well as computer readable memory articles of manufacture which, when used in conjunction with a computer can carry out phrase recognition. Thus, the invention's scope includes not only the method itself, but apparatus and articles of manufacture.

Applications of the phrase recognition method. The phrase recognition method described above can be used in a variety of text searching systems. These include, but need not be limited to, dynamic phrase recognition in on-line systems, batch phrase recognition in a distributed development system, and batch phrase recognition in a mainframe system. The following description of the applications of the inventive phrase recognition method is illustrative, and should not limit the scope of the invention as defined by the claims.

In an on-line system (OLS) envisioned as a target application for the inventive phrase recognition method, a user viewing a current document and entering a command to search for documents of similar conceptual content must wait for the phrase recognition process to be completed. Accordingly, the efficiency of the inventive phrase recognition method is important, as it allows reduced response time and uses minimal resources in a time-sharing environment.

According to the application of the invention in a given on-line system, the method processes the text in a single document in real time to arrive at a list of "good" phrases, namely, ones which can be used as accurate and meaningful indications of the document's conceptual content, and which can be used as similarly accurate and meaningful queries in subsequent search requests. In particular, according to a preferred application, the Phrase List derived from the single document is used to construct a new search description to retrieve additional documents with similar conceptual content to the first document.

This implementation of the phrase recognition method may, for example, be embedded in session administrator (FIG. 2) or other software which governs operation of the computer system on which the phrase recognition method. Of course, the particular implementation will vary with the software and hardware environment of the particular application in question.

FIG. 7A indicates a user's viewing of a document in accordance with a suitable on-line text search system, and invoking the inventive phrase recognition method to search for additional documents of similar conceptual content. In particular, block 701 assumes a user viewing a given document enters a command (such as ".more") to retrieve more documents similar in conceptual content to the current one being viewed.

When the ".more" command is entered, control passes to block 702 which indicates retrieval of the document being viewed and passing it to the session administrator or other software which includes the inventive phrase recognition software.

Block 703 indicates execution of the inventive phrase recognition method on the text in the retrieved document. A candidate phrase list is generated, based on that single document.

Block 704 indicates how the candidate phrase list generated from the single document may be validated against an existing (larger) phrase dictionary. The static phrase dictionary may be generated as described below, with reference to the batch phrase recognition application in a distributed development system.

If a candidate phrase does not already exist in the phrase dictionary, the candidate phrase is broken down into its component words. Ultimately, a list of surviving phrases is chosen, based on frequency of occurrence.

At decision block 705, if at least a given threshold number of words or phrases (e.g., five words or phrases) is extracted, control passes from decision block 705 to block 708, described below.

If, however, the given threshold number of words or phrases are not extracted, control passes from decision block 705 along path 706 back to block 701, after displaying an error message at block 707 which indicates that the displayed current document could not successfully be processed under the ".more" command.

Block 708 indicates that the newly-added words or phrases are added to the search query which previously resulted in the user's viewing the current document. Block 709 indicates the system's displaying the new "combined" search query to the user. The user may edit the new query, or may simply accept the new query by pressing "enter".

FIG. 7B schematically indicates implementation of the phrase recognition method in a batch phrase recognition system in a distributed development system.

In contrast to the implementation of the on-line system of FIG. 7A, in the application shown in FIG. 7B, the phrase recognition method is applied to a large collection of documents, and produces a list of phrases associated with the entire collection. As mentioned above with reference to FIG. 7A, the phrase dictionary may be generated by this batch recognition process in the "distributed development domain" (DDD) when there is an abundance of idle system resources. When the on-line system then uses the resultant phrase dictionary, the phrase dictionary is essentially static, having been generated and modified outside the on-line sessions.

The FIG. 7B application takes longer to execute than the single-document phrase recognition process occurring in the dynamic phrase recognition in the on-line application. Accordingly, the FIG. 7B process is preferably executed as a batch process at times when overall system usage is not impaired, such as overnight. In particular, the software implementation of the phrase recognition/phrase dictionary building process may be implemented on SUN work stations.

As a background to FIG. 7B, a developer's control file defines which documents, and/or which portions of the documents, should be processed in a given run. Block 723 indicates a filtering process which filters out documents and portions of documents which are not desired to contribute to the phrase dictionary, based on the control file. Block 724 indicates application of the inventive phrase recognition method to the documents and portions of documents which have passed through filter process 723.

The output of the phrase recognition process is a phrase list (PL) which, in the illustrated non-limiting embodiment, is stored as a standard UNIX text file on disk. In a preferred embodiment, single-word terms which are encountered are discarded, so that only multiple word phrases are included in the phrase list (PL).

For simplicity, each phrase is provided on a single line in the file. Block 725 indicates how the UNIX file is sorted using, for example, the standard UNIX sort utility, causing duplicate phrases to be grouped together. Block 725 also calculates the frequency of each of the grouped phrases.

If a given phrase occurs less than a given threshold number of times (e.g., five times as tested by decision block 727) it is discarded, as indicated by decision block 726. Only phrases which have been encountered at least that threshold number of times survive to be included in the revised Phrase List, as shown in block 728.

The revised Phrase List is then transferred from the SUN work station to its desired destination for use in, for example, the on-line system described above. It may also be transferred to a main frame computer using a file transfer protocol FTP, to be processed by a phrase dictionary building program and compiled into a production phrase dictionary. This process is shown illustrated as block 729.

Referring now to FIG. 7C, the application of the inventive phrase recognition method on a mainframe system is schematically illustrated. In the illustrated application, the phrase recognition method is implemented as a batch process in a production mainframe. The process involves a random sample of documents from a larger collection of documents, and produces a set of phrases for each document processed. The process is preferably executed when system resources are not otherwise in high demand, such as overnight. The process of FIG. 7C is especially useful for use with statistical thesauri.

As a background, it is assumed that phrases may be considered to be "related" to each other if they occur in the same document. This "relationship" can be exploited for such purposes as expanding a user's search query. However, in order to provide this ability, large number of documents must first be processed.

Referring again to FIG. 7C, block 733 indicates the filtering of documents and portions thereof in accordance with specifications from a control file, in much the same manner as described with reference to FIG. 7B. Block 734 indicates the application of the inventive phrase recognition method to the documents which pass the filter. One set of terms (single words, phrases or both) is produced for each document and stored in respective suitably formatted data structure on a disk or other storage medium.

Further details of implementation of the applications of the inventive phrase recognition method depend on the particular hardware system, software platform, programming languages, and storage media being chosen, and lie within the ability of those skilled in the art.

The following List are exemplary, illustrative, non-limiting examples of a Partition List and other lists which may be used with an embodiment of the phrase recognition method according to the present invention.

List A
Example of PARTITION LIST
(On-Line System with News Data)
Copyright 1995
LEXIS-NEXIS, a Division of Reed Elsevier Inc.

| | | | |
|---|---|---|---|
| A | BAITH | EVERYTHING | HEREOF |
| A.M | BE | EXCEPT | HEREON |
| ABOUT | BECAME | FEB | HERETO |
| ABOVE | BECAUSE | FEBRUARY | HEREWITH |
| ACROSS | BEEN | FEW | HERN |
| AFFECT | BEFORE | FEWER | HERSELF |
| AFTER | BEING | FIFTEEN | HIC |
| AGAIN | BELOW | FIVE | HIM |
| AGO | BETWEEN | FOR | HIMSELF |
| ALL | BOTH | FOUR | HIS |
| ALREADY | BUT | FOURTEEN | HIS'N |
| ALSO | BY | FRI | HISSELF |
| ALTHOUGH | CAN | FRIDAY | HOC |
| ALWAY | COULD | FROM | HOW |
| AN | DEC | GET | HOWEVER |
| AND | DECEMBER | GO | I |
| ANOTHER | DID | GOT | I'D |
| ANY | DO | HAD | I'LL |
| ANYBODY | DOE | HAPPEN | I'M |
| ANYMORE | DUE | HARDLY | I'VE |
| ANYONE | DURING | HAS | I.E |
| ANYTHING | E.G | HAVE | IF |
| APR | EACH | HAVING | IN |
| APRIL | EIGHT | HE | INTO |
| ARE | EIGHTEEN | HENCE | IS |
| AROUND | EITHER | HER | IT |
| AS | ELEVEN | HER'N | ITS |
| ASIDE | EVEN | HERE | ITSELF |
| ASK | EVENTUALLY | HEREAFTER | JAN |
| AT | EVER | HEREBY | JANUARY |
| AUG | EVERYBODY | HEREIN | JUL |
| AUGUST | EVERYMAN | HEREIN- | JULY |

List A
Example of PARTITION LIST
(On-Line System with News Data)
Copyright 1995
LEXIS-NEXIS, a Division of Reed Elsevier Inc.

-continued

| | | | |
|---|---|---|---|
| AWAY | EVERYONE | AFTER HEREIN-SOFAR | JUN |
| JUNE | ONLY | SOMEBODY | THREE |
| JUST | ONTO | SOMEONE | THROUGH |
| LIKE | OR | SOMETHING | THUR |
| MANY | OTHER | SOMETIME | THURSDAY |
| MAR | OTHERWISE | SOMEWHERE | THUS |
| MARCH | OUGHT | SOONER | THY |
| MAY | OUR | STILL | THYSELF |
| ME | OUR'N | SUCCUSSION | TILL |
| MIGHT | OURSELF | SUCH | TO |
| MINE | OURSELVE | SUN | TODAY |
| MON | OUT | SUNDAY | TOMORROW |
| MONDAY | OVER | TAKE | TOO |
| MORE | P.M | TEN | TUB |
| MUCH | PERHAP | THAE | TUESDAY |
| MUST | QUIBUS | THAN | TWELVE |
| MY | QUITE | THAT | TWENTY |
| MYSELF | RATHER | THE | TWO |
| N.S | REALLY | THEE | UN |
| NANE | REV | THEIR | UNDER |
| NEITHER | SAID | THEIRSELF | UNLESS |
| NEVERTHELESS | SAME | THEIRSELVE | UNTIL |
| NINE | SAT | THEM | UNTO |
| NINETEEN | SATURDAY | THEMSELVE | UP |
| NO | SAY | THEN | UPON |
| NOBLEWOMAN | SEE | THERE | US |
| NOBODY | SEEMED | THEREAFTER | USE |
| NONE | SELF | THEREBY | VERY |
| NOR | SEP | THEREFORE | VIZ |
| NOT | SEPT | THEREFROM | WAS |
| NOV | SEPTEMBER | THEREIN | WE |
| NOVEMBER | SEVEN | THEREOF | WED |
| NOW | SEVENTEEN | THEREON | WEDNESDAY |
| O.S | SEVERAL | THERETO | WERE |
| OCT | SHE | THEREWITH | WHAT |
| OCTOBER | SHOULD | THESE | WHATE'ER |
| OF | SINCE | THEY | WHATEVER |
| OFF | SIR | THIRTEEN | WHATSOE'ER |
| OFTEN | SIX | THIS | WHATSOEVER |
| ON | SIXTEEN | THOSE | WHEN |
| ONE | SO | THOU | WHENEVER |
| ONESELF | SOME | THOUGH | WHENSOEVER |
| WHERE | 17TH | | |
| WHEREBY | 18TH | | |
| WHEREEVER | 19TH | | |
| WHEREIN | 2D | | |
| WHETHER | 2ND | | |
| WHICH | 20TH | | |
| WHICHEVER | 21ST | | |
| WHICHSOEVER | 3D | | |
| WHILE | 3RD | | |
| WHO | 4TH | | |
| WHOEVER | 5TH | | |
| WHOM | 6TH | | |
| WHOMSOEVER | 7TH | | |
| WHOSE | 8TH | | |
| WHOSESOEVER | 9TH | | |
| WHOSO | | | |
| WHOSOEVER | | | |
| WHY | | | |
| WILL | | | |
| WITH | | | |
| WITHIN | | | |
| WITHOUT | | | |
| WOULD | | | |
| YA | | | |
| YE | | | |
| YES | | | |
| YESTERDAY | | | |
| YET | | | |
| YON | | | |
| YOU | | | |

List A
Example of PARTITION LIST
(On-Line System with News Data)
Copyright 1995
LEXIS-NEXIS, a Division of Reed Elsevier Inc.

YOUR
YOUR'N
YOURSELF
1ST
10TH
11TH
12TH
13TH
14TH
15TH
16TH

List B
Example of COMPANY INDICATOR LIST
Copyright 1995
LEXIS-NEXIS, a Division of Reed Elsevier Inc.

BROS
BROS.
BROTHERS
CHARTERED
CHTD
CHTD.
CL
CL.
CO
CO.
COMPANY
CORP
CORP.
CORPORATION
CP
CP.
ENTERPRISES
GP
GP.
GROUP
INC
INC.
INCORP
INCORP.
INCORPORATED
INE
INE.
LIMITED
LNC
LNC.
LTD
LTD.

List C
Example of PRODUCT NAME LIST
Copyright 1995
LEXIS-NEXIS, a Division of Reed Elsevier Inc.

| | | |
|---|---|---|
| 240sx | Infinity | Reebok |
| 300sx | Ingres | Rolaids |
| 4-Runner | JVC | SA8 |
| 7Up | Jaguar | Sable |
| Access | Jeep | Sentra |
| Adobe | Keds | Seven-Up |
| Altima | Kleenex | Solaris |
| Arid | L.O.C. | Sony |
| Avia | Lexus | Sprite |
| B-17 | Linux | Suave |
| B17 | Lotus | Sun |
| BMW | Magnavox | Sybase |
| Bayer | Maxima | Taurus |
| Blazer | Mercedes | Tide |
| Bounty | Minolta | Toshiba |
| Camary | Mitsubishi | Tums |
| Cannon | Mustang | Tylenol |
| Chevy | Nike | Windex |
| Cirrus | Nikon | Windows |
| Coke | O52 | Yashika |
| Converse | Oracle | Zoom |
| Corvette | P100 | |
| Etonic | P120 | |
| Excel | P133 | |
| F-14 | P60 | |
| F-15 | P75 | |
| F-16 | P90 | |
| F-18 | Paradox | |
| F-22 | Pepsi | |
| F14 | Preparation-H | |
| F15 | Puffs | |
| F16 | Puma | |
| F18 | Quicken | |
| F22 | Rave | |

List D
Example of ORGANIZATION INDICATOR LIST
Copyright 1995
LEXIS-NEXIS, a Division of Reed Elsevier Inc.

| | |
|---|---|
| ADMINISTRATION | MEN |
| AGENCY | ORGANIZATION |
| ARMY | PARLIAMENT |
| ASSEMBLY | PARLIMENT |
| ASSOCIATION | PARTY |
| BOARD | REPUBLIC |
| BUREAU | SCHOOL |
| CENTER | SENATE |
| CHURCH | SOCIETY |
| CLINIC | TEAM |
| CLUB | UNION |
| COLLEGE | UNIVERSITY |
| COMMISSION | |
| COMMITTEE | |
| COMMUNITY | |
| CONGRESS | |
| COUNCIL | |
| COURT | |
| CULT | |
| DEPARTMENT | |
| DEPT | |
| FACTION | |
| FEDERATION | |
| FOUNDATION | |
| GOVERNMENT | |
| GUILD | |
| HOSPITAL | |
| HOUSE | |
| INDUSTRY | |
| INSTITUTE | |
| LEAGUE | |

List E
Example of ENGLISH FIRST-NAME LIST
Copyright 1995
LEXIS-NEXIS, a Division of Reed Elsevier Inc.

| | | | |
|---|---|---|---|
| AARON | ADOLF | ALBERT | ALLECIA |
| ABAGAIL | ADOLPH | ALBERTA | ALLEEN |
| ABBIE | ADOLPHUS | ALBIN | ALLEGRA |

List E
Example of ENGLISH FIRST-NAME LIST
Copyright 1995
LEXIS-NEXIS, a Division of Reed Elsevier Inc.

| | | | | | | | |
|---|---|---|---|---|---|---|---|
| ABBY | ADORA | ALDO | ALLEN | BART | BERTON | BORIS | BRUNO |
| ABE | ADRIAN | ALDUS | ALLENE | BARTHOLOMEW | BERTRAM | BOYCE | BRYAN |
| ABEGAIL | ADRIANE | ALEC | ALLICIA | BARTON | BERTRAND | BOYD | BRYANT |
| ABEL | ADRIANNE | ALECIA | ALLIE | BASIL | BERTRUM | BRACIE | BRYCE |
| ABELARD | ADRIEN | ALECK | ALLISON | BAYARD | BERYL | BRACK | BRYON |
| ABIGAIL | ADRIENNE | ALENE | ALLOYSIUS | BEA | BESS | BRAD | BUBBA |
| ABNER | AERIEL | ALEX | ALLY | BEATRICE | BESSIE | BRADDOCK | BUCK |
| ABRAHAM | AGATHA | ALEXANDER | ALLYN | BEATRIX | BETH | BRADLEY | BUCKY |
| ABRAM | AGGIE | ALEXANDRA | ALMA | BEAUREGARD | BETSEY | BRADLY | BUD |
| ACIE | AGGY | ALEXANDRINA | ALMETA | BEBE | BETSIE | BRAINARD | BUDDIE |
| ACY | AGNES | ALEXEI | ALMIRA | BECCA | BETSY | BRAINERD | BUDDY |
| ADA | AGNETA | ALEXI | ALMON | BECKY | BETTE | BRANDI | BUEL |
| ADAH | AGUSTIN | ALEXIA | ALONZA | BEE | BETTIE | BRANDY | BUELL |
| ADAIR | AHARON | ALEXIS | ALOYSIUS | BELINDA | BETTY | BRANKA | BUFFIE |
| ADALBERT | AIDA | ALF | ALPHA | BELLA | BETTYE | BREK | BUFFY |
| ADALINE | AILEEN | ALFIE | ALPHONSUS | BELLE | BEULAH | BRENARD | BUFORD |
| ADAM | AILEENE | ALFIO | ALTA | BEN | BEVERLEE | BRENDA | BUNNIE |
| ADDAM | AILENE | ALFORD | ALTHEA | BENEDICT | BEVERLIE | BRENDAN | BUNNY |
| ADDIE | AIME | ALFRED | ALTON | BENJAMIN | BEVERLY | BRENT | BURL |
| ADDY | AIMEE | ALFREDA | ALVA | BENJI | BEWANDA | BRET | BURNELL |
| ADELA | AINSLEE | ALFY | ALVAH | BENNETT | BIFF | BRETT | BURNETTA |
| ADELAIDE | AINSLEY | ALGERNON | ALVESTER | BENNIE | BILL | BRIAN | BURNICE |
| ADELBERT | AJA | ALICE | ALVIN | BENNO | BILLIE | BRICE | BURREL |
| ADELE | AL | ALICIA | ALYCE | BENNY | BILLY | BRIDGET | BURT |
| ADELENE | ALAIN | ALINE | AMALIA | BENTLEY | BIRD | BRIDGETT | BURTON |
| ADELINE | ALAINE | ALISA | AMANDA | BERKE | BJARNE | BRIDGETTE | BURTRAM |
| ADELLA | ALAN | ALISHA | AMARYLLIS | BERKELEY | BJORN | BRIDIE | BUSTER |
| ADELLE | ALANAH | ALISON | AMBER | BERKELY | BJORNE | BRIGIT | BUTCH |
| ADLAI | ALANNA | ALIX | AMBROSE | BERKLEY | BLAINE | BRIGITTE | BYRON |
| ADNA | ALASTAIR | ALLAN | AMBROSIA | BERLE | BLAIR | BRIJITTE | CAESAR |
| AMBROSIUS | ANNEMARIE | ARLO | AUDREY | BERNARD | BLAKE | BRITNY | CAITLIN |
| AMELIA | ANNETTA | ARMAND | AUDRIE | BERNETTA | BLANCA | BRITTANY | CAL |
| AMIE | ANNETTE | ARMIN | AUDRY | BERNETTE | BLANCH | BRITTNEY | CALE |
| AMILE | ANNICE | ARMOND | AUDY | BERNHARD | BLANCHE | BRITTNY | CALEB |
| AMITY | ANNIE | ARNE | AUGIE | BERNICE | BOB | BROCK | CALLA |
| AMON | ANNINA | ARNETT | AUGUST | BERNIE | BOBBI | BRODERICK | CALLIE |
| AMOS | ANNMARIE | ARNEY | AUGUSTINE | BERRIE | BOBBIE | BROOKE | CALLY |
| AMY | ANSEL | ARNIE | AUGUSTUS | CALVIN | CARROLL | CHARLEEN | CHRYSTAL |
| ANA | ANSELM | ARNOLD | AURELIA | CAM | CARSON | CHARLENE | CHUCK |
| ANABEL | ANSON | ARON | AURELIUS | CAMDEN | CARY | CHARLES | CHUMLEY |
| ANABELLE | ANTHONY | ART | AUSTEN | CAMERON | CARYL | CHARLESE | CICELY |
| ANALISE | ANTOINE | ARTE | AUSTIN | CAMILE | CARYN | CHARLETON | CICILY |
| ANASTASIA | ANTOINETTE | ARTEMIS | AUTHER | CAMILLA | CAS | CHARLEY | CINDI |
| ANATOLY | ANTON | ARTEMUS | AUTRY | CAMILLE | CASEY | CHARLIE | CINDY |
| ANCIL | ANTONE | ARTHUR | AUVEL | CANDACE | CASI | CHARLINE | CLAIR |
| ANDIE | ANTONETTE | ARTIE | AVA | CANDI | CASPAR | CHARLISE | CLAIRE |
| ANDREA | ANTONI | ARTIS | AVERY | CANDICE | CASPER | CHARLOTTA | CLARA |
| ANDREAS | ANTONIA | ARTY | AVIS | CANDIS | CASS | CHARLOTTE | CLARA-BELLE |
| ANDREE | ANTONIO | ARVELL | AVITUS | | | | |
| ANDREI | ANTONY | ARVIE | AVON | CANDUS | CASSANDRA | CHARLTON | CLARE |
| ANDREJ | AP | ARVO | AVRAM | CANDY | CASSIE | CHAS | CLARENCE |
| ANDREW | APOLLO | ARVON | AXEL | CANNIE | CASSIUS | CHASTITY | CLARICE |
| ANDY | APRIL | ASA | AZZIE | CARA | CATHARINE | CHAUNCEY | CLARINA |
| ANETTA | ARA | ASHELY | AZZY | CAREN | CATHERINE | CHELSIE | CLARISSA |
| ANETTE | ARAM | ASHER | BABETTE | CAREY | CATHLEEN | CHER | CLARK |
| ANGELA | ARBY | ASHLEIGH | BAILEY | CARI | CATHLENE | CHERI | CLASSIE |
| ANGELICA | ARCH | ASHLEY | BAIRD | CARIN | CATHRINE | CHERIE | CLAUD |
| ANGELINA | ARCHIBALD | ASTER | BALTHAZAR | CARL | CATHRYN | CHERYL | CLAUDE |
| ANGELINE | ARCHIE | ASTOR | BAMBI | CARLA | CATHY | CHESTER | CLAUDELLE |
| ANGELIQUE | ARETHA | ASTRID | BARB | CARLEEN | CEASAR | CHET | CLAUDETTE |
| ANGIE | ARIC | ATHENA | BARBARA | CARLENE | CEATRICE | CHIP | CLAUDIA |
| ANGUS | ARICA | ATHENE | BARBEE | CARLETON | CECELIA | CHLOE | CLAUDINE |
| ANITA | ARIEL | ATTILIO | BARBI | CARLINE | CECIL | CHLORIS | CLAUDIUS |
| ANN | ARISTOTLE | AUBREY | BARBIE | CARLISLE | CECILE | CHRIS | CLAUS |
| ANNA | ARLAN | AUBRIE | BARBRA | CARLTON | CECILIA | CHRISSIE | CLAY |
| ANNABEL | ARLEEN | AUBRY | BARNABAS | CARLY | CECILY | CHRISSY | CLAYMON |
| ANNABELLE | ARLEN | AUD | BARNABUS | CARLYLE | CEDRIC | CHRISTA | CLAYTON |
| ANNALEE | ARLENE | AUDEY | BARNABY | CARMINE | CEFERINO | CHRISTABEL | CLEIO |
| ANNE | ARLIE | AUDIE | BARNARD | CAROL | CELESTE | CHRISTABELLE | CLEM |
| ANNELIESE | ARLIN | AUDINE | BARNET | CAROLA | CELESTINE | CHRISTAL | CLEMENT |
| ANNELISE | ARLINE | AUDIO | BARNETT | CAROLANN | CELIA | CHRISTIAAN | CLEMENTINE |
| BARNEY | BERRY | BOBBY | BROOKS | CAROLE | CELINA | CHRISTIAN | CLEMENZA |
| BARNY | BERT | BONME | BRUCE | CAROLE | CESAR | CHRISTIE | CLENELL |
| BARRETT | BERTHA | BONNY | BRUNHILDA | CAROLINE | CHAD | CHRISTINE | CLEO |
| BARRY | BERTHOLD | BOOKER | BRUNHILDE | CAROLYN | CHADWICK | CHRISTOFER | CLEOPHUS |

List E
Example of ENGLISH FIRST-NAME LIST
Copyright 1995
LEXIS-NEXIS, a Division of Reed Elsevier Inc.

| | | | |
|---|---|---|---|
| CAROLYNN | CHAIM | CHRISTOPH | CLEOTHA |
| CARREN | CHANCY | CHRISTOPHER | CLEOTIS |
| CARRIE | CHANDLER | CHRISTOS | CLETA |
| CARRIN | CHARITY | CHRISTY | CLETUS |
| CLEVE | CORKY | DAGMAR | DARRIN |
| CLEVELAND | CORNEAL | DAGWOOD | DARRYL |
| CLEVON | CORNELIA | DAISEY | DARWIN |
| CLIFF | CORNELIUS | DAISY | DARYL |
| CLIFFORD | CORRIE | DALE | DASHA |
| CLIFT | CORRINE | DALTON | DAVE |
| CLIFTON | CORRINNE | DAMIAN | DAVEY |
| CLINT | CORRY | DAMIEN | DAVID |
| CLINTON | CORTNEY | DAMION | DAVIDA |
| CLIO | CORY | DAMON | DAVIE |
| CLITUS | COSMO | DAN | DAVY |
| CLIVE | COUNTEE | DAN'L | DAWN |
| CLOVIA | COURTLAND | DANA | DEAN |
| CLOVIS | COURTNEY | DANIEL | DEANDRA |
| CLOYD | COY | DANIELLA | DEANE |
| CLYDE | CRAIG | DANIELLE | DEANNA |
| CODELL | CRIS | DANNA | DEANNE |
| COLBERT | CRISPIN | DANNY | DEB |
| COLE | CRISPUS | DANO | DEBBI |
| COLEEN | CRISSIE | DANUTA | DEBBIE |
| COLETTE | CRISSY | DAPHNE | DEBBY |
| COLIN | CRISTABEL | DARBIE | DEBORA |
| COLITA | CRISTA-BELLE | DARBY | DEBORAH |
| COLLEEN | CRYSTAL | DARCEE | DEBRA |
| COLLETTE | CURLESS | DARCEY | DEBS |
| COLLIN | CURLY | DARCI | DEDIE |
| COLON | CURT | DARCIE | DEE |
| CONNIE | CURTIS | DARCY | DEEANN |
| CONNY | CY | DARIEN | DEEANNE |
| CONRAD | CYBIL | DARIO | DEEDEE |
| CONROY | CYBILL | DARIUS | DEIDRE |
| CONSTANCE | CYNDI | DARLA | DEL |
| CONSTANTIA | CYNDY | DARLEEN | DELAINE |
| COOKIE | CYNTHIA | DARLENE | DELANE |
| CORA | CYRIL | DARLINE | DELANO |
| CORABELLE | CYRILL | DARLYNE | DELBERT |
| CORDELIA | CYRILLA | DARNELL | DELIA |
| COREY | CYRUS | DAROLD | DELL |
| CORINE | DABNEY | DARREL | DELLA |
| CORINNE | DACIA | DARRELL | DELLO |
| CORKIE | DACIE | DARREN | DELMA |
| DELMAR | DEVORAH | DONELL | DUAIN |
| DELMAS | DEWANE | DONELLE | DUAINE |
| DELMO | DEWAYNE | DONICE | DUANE |
| DELNO | DEWEY | DONIS | DUB |
| DELORES | DEWITT | DONNA | DUDLEY |
| DELORIS | DEXTER | DONNELL | DUEL |
| DELOY | DEZ | DONNELLE | DUELL |
| DELTA | DIAHANN | DONME | DUFF |
| DEMETRICE | DIANA | DONNY | DUFFY |
| DEMETRIUS | DIANE | DONOVAN | DUGALD |
| DENARD | DIANNA | DORA | DUKE |
| DENE | DIANNE | DORCAS | DULCIE |
| DENICE | DICK | DORCE | DULSA |
| DENILLE | DICKEY | DOREEN | DUNCAN |
| DENIS | DICKIE | DORI | DURWARD |
| DENISE | DIDI | DORIAN | DURWOOD |
| DENNIE | DIEDRE | DORIE | DUSTIN |
| DENNIS | DIERDRE | DORIENNE | DUSTY |
| DENNY | DIETER | DORINE | DWAIN |
| DENNYS | DIETRICH | DORIS | DWAINE |
| DENORRIS | DIMITRI | DOROTHA | DWAYNE |
| DEO | DINA | DOROTHEA | DWIGHT |
| DEON | DINAH | DOROTHY | DYLAN |
| DEREK | DINO | DORRANCE | DYNAH |
| DEREWOOD | DION | DORRIS | EARL |
| DERICK | DIRK | DORSEY | EARLE |
| DERL | DIXIE | DORTHIE | EARLENE |
| DERMOT | DMITRI | DORTHY | EARLINE |
| DERMOTT | DOLLIE | DOSHIE | EARNEST |
| DERRALL | DOLLY | DOT | EARNESTINE |
| DERREK | DOLORES | DOTTIE | EARTHA |
| DERRICK | DOM | DOTTY | EARTHEL |
| DERRY | DOMENIC | DOTY | EBEN |
| DERWOOD | DOMENICK | DOUG | EBENEEZER |
| DESDEMONA | DOMER | DOUGIE | EBENEZER |
| DESI | DOMINIC | DOUGLAS | EBERHARD |
| DESIRE | DOMINICK | DOUGLASS | EBONY |
| DESIREE | DOMINICKA | DOY | ED |
| DESMOND | DOMINIQUE | DOYLE | EDD |
| DESMUND | DON | DREW | EDDIE |
| DEVON | DONALD | DRU | EDDY |
| EDGAR | ELEONORA | ELSIE | EPHRIAM |
| EDGER | ELI | ELTON | ERASMUS |
| EDIE | ELIAS | ELVA | ERBIN |
| EDISON | ELIC | ELVERT | ERIC |
| EDITA | ELIJAH | ELVIE | ERICA |
| EDITH | ELINORE | ELVIN | ERICH |
| EDMOND | ELIOT | ELVIRA | ERICK |
| EDMUND | ELISABETH | ELVIS | ERIK |
| EDNA | ELISE | ELVON | ERIKA |
| EDRIS | ELISHA | ELWOOD | ERIN |
| EDSEL | ELISSA | ELY | ERLAND |
| EDUARD | ELIUS | ELZA | ERLE |
| EDWARD | ELIZA | EMELDA | ERMA |
| EDWIN | ELIZABETH | EMERiC | ERMAN |
| EDWINA | ELIZAR | EMERY | ERNEST |
| EDY | ELKE | EMETT | ERNESTINE |
| EDYTH | ELLA | EMIL | ERNESTO |
| EDYTHE | ELLE | EMILE | ERNIE |
| EFFIE | ELLEN | EMILIE | ERNST |
| EFRAIM | ELLERY | EMILY | ERROL |
| EGBERT | ELLIE | EMMA | ERVAN |
| EGIDIO | ELLIET | EMMALINE | ERVEN |
| EILEEN | ELLIOT | EMMERY | ERVIN |
| ELA | ELLIOTT | EMMET | ERWIN |
| ELAINE | ELLIS | EMMETT | ESAU |
| ELAYNE | ELLY | EMMIE | ESMERELDA |
| ELBA | ELLYN | EMMOT | ESTA |
| ELBERT | ELMA | EMMOTT | ESTEL |
| ELBERTA | ELMER | EMMY | ESTELA |
| ELDA | ELMIRA | EMOGENE | ESTELLA |
| ELDINE | ELMO | EMORY | ESTELLE |
| ELDON | ELNOR | ENDORA | ESTHR |
| ELDORA | ELNORA | ENDRE | ESTHA |
| ELE | ELOI | ENGBLBERT | ESTHER |
| ELEANOR | ELOISE | ENID | ETHAN |
| ELEANORA | ELOUISE | ENISE | ETHEL |
| ELEANORE | ELOY | ENNIS | ETHELENE |
| ELECTRA | ELRIC | ENOCH | ETHELINE |
| ELENA | ELROY | ENOLA | ETHYL |
| ELENORA | ELSA | ENZO | ETIENNE |
| ELENORE | ELSBETH | EPHRAIM | ETTA |
| ETTIE | FARRELL | FRANCIA | GALE |
| EUDORA | FARRIS | FRANCINE | GALLON |
| EUFA | FATIMA | FRANCIS | GARETH |
| EUGENE | FAUN | FRANCOIS | GARLAND |
| EUGENIA | FAWN | FRANCOISE | GARNET |
| EUGENIE | FAY | FRANK | GAROLD |
| EUGENIO | FAYE | FRANKIE | GARRET |
| EULA | FELECIA | FRANKLIN | GARRETT |
| EULALEE | FELICIA | FRANKLYN | GARRIE |
| EULALIE | FELICITY | FRANKY | GARRY |
| EULOGIO | FELIX | FRANNIE | GARTH |
| EUNACE | FELIZ | FRANNY | GARVIN |
| EUNICE | FERD | FRANZ | GARY |
| EUPHEMIA | FERDINAND | FRANZI | GASTON |
| EUSTACE | FERGUS | FRANZIE | GAVIN |
| EVA | FERN | FRANZY | GAY |
| EVALEE | FERREL | FRED | GAYE |
| EVAN | FERRELL | FREDA | GAYLE |
| EVANDER | FERRIS | FREDDIE | GAYLORD |
| EVANGELINE | FIDELE | FREDDY | GEARY |
| EVE | FIFI | FREDERICH | GEMMA |
| EVELYN | FILBERT | FREDERICK | GENA |

List E
Example of ENGLISH FIRST-NAME LIST
Copyright 1995
LEXIS-NEXIS, a Division of Reed Elsevier Inc.

| | | | |
|---|---|---|---|
| EVERETT | FILIPPO | FREDERIK | GENE |
| EVERETTE | FIONA | FREEMAN | GENEVA |
| EVETTE | FITZ | FREIDA | GENEVIEVE |
| EVITA | FLETCHER | FRIEDA | GENIE |
| EWALD | FLO | FRIEDRICH | GENNARO |
| EWIN | FLOR | FRITZ | GENNIE |
| EZEKIEL | FLORA | FRONA | GENNIFER |
| BZRA | FLORANCE | FYODOR | GENNY |
| FABIAN | FLORENCE | GABBEY | GENO |
| FABIEN | FLORIDA | GABBIE | GEO |
| FAIRLEIGH | FLOSSIE | GABE | GEOFF |
| FAITH | FLOSSY | GABRIEL | GEOFFREY |
| FANNIE | FLOYD | GABRIELE | GEORGE |
| FANNY | FONDA | GABRIELLE | GEORGES |
| FARAH | FONTAINE | GABY | GEORGETTE |
| FARLEIGH | FORD | GAEL | GEORGIA |
| FARLEY | FORREST | GAETANO | GEORGIE |
| FARRAH | FRAN | GAGE | GEORGINA |
| FARREL | FRANCES | GAIL | GERALD |
| GERALDINE | GIULIA | GREGGORY | GWENETTA |
| GERARD | GIUSEPPE | GREGORY | GWENETTE |
| GERD | GIUSEPPI | GRETA | GWENITH |
| GERDINE | GIUSEPPINA | GRETCHEN | GWENN |
| GERHARD | GLADIS | GRETEL | GWENNE |
| GERI | GLADYCE | GRIFF | GWENNETH |
| GERMAIN | GLADYS | GRIFFIN | GWENYTH |
| GERMAINE | GLEN | GRIFFITH | GWYEN |
| GEROLD | GLENDA | GROVER | GWYLLEN |
| GEROME | GLENDON | GUENTHER | GWYN |
| GERRIE | GLENN | GUERINO | GWYNETH |
| GERRIT | GLENNA | GUIDO | GWYNNE |
| GERRY | GLENME | GUILLERMINA | GYULA |
| GERT | GLENNIS | GUILLERMO | HAILEY |
| GERTA | GLENNON | GUISEPPE | HAL |
| GERTIE | GLORIA | GUNNER | HALLIE |
| GERTRUDE | GLYN | GUNTER | HALLY |
| GEZA | GLYNDA | GUNTHER | HAMISH |
| GIA | GLYMS | GUS | HAMPTON |
| GIACOMO | GLYNN | GUSSIE | HANK |
| GIDEON | GLYNMS | GUSSY | HANNA |
| GIFFORD | GODFREY | GUST | HANNAH |
| GIGI | GODFRY | GUSTAF | HANNE |
| GIL | GODWIN | GUSTAV | HANNES |
| GILBERT | GOLDA | GUSTAVE | HANNIBAL |
| GILDA | GOLDIE | GUSTAVUS | HANS |
| GILES | GOLDY | GUSTOV | HANSELL |
| GILLIAN | GOMER | GUY | HARLAN |
| GILLIGAN | GORDAN | GWEN | HARLEN |
| GINA | GORDON | GWENDA | HARLEY |
| GINGER | GOTTFRIED | GWENDALYN | HARLIE |
| GINNI | GRACE | GWENDEN | HARLY |
| GINNIE | GRACIA | GWENDLYN | HARMIE |
| GINNY | GRACIE | GWENDOLA | HARMON |
| GINO | GRADY | GWENDOLEN | HAROL |
| GIORA | GRAEME | GWENDOLINE | HAROLD |
| GIOVANNA | GRAHAM | GWENDOLY | HARREL |
| GIOVANNI | GRANT | GWENDOLYN | HARRIET |
| GISELA | GRAYCE | GWENDOLYNE | HARRIETT |
| GISELLA | GREG | GWENDY | HARRIETTA |
| GISELLE | GREGG | GWENETH | HARRIS |
| HARRISON | HENRYK | HOLLIS | ILA |
| HARROLD | HERE | HOLLISTER | ILAH |
| HARRY | HERBERT | HOLLY | ILEEN |
| HARVEY | HERBIE | HOLLYANN | ILENA |
| HARVIE | HERBY | HOLLYANNE | ILENE |
| HASSLE | HERCULE | HOMER | ILSE |
| HATTIE | HERLINDA | HONEY | IMELDA |
| HATTY | HERM | HONORIA | IMOGENE |
| HAYDEE | HERMA | HOPE | INA |
| HAYDEN | HERMAN | HORACE | INGA |
| HAYDON | HERMANN | HORST | INGE |
| HAYLEY | HERMIE | HORTENSE | INGGA |
| HAYWOOD | HEROLD | HORTENSIA | INGRAM |
| HAZEL | HERSCH | HORTON | INGRID |
| HEATHCLIFF | HERSCHEL | HOSBA | IOLA |
| HEATHER | HERSHEL | HOWARD | IONA |
| HECTOR | HESTER | HOWIE | IONE |
| HEDDA | HESTHER | HOYT | IRA |
| HEDDIE | HETTA | HUBERT | IRAD |
| HEDWIG | HETTIE | HUEL | IRENA |
| HEIDI | HETTLE | HUEY | IRENE |
| HEINRICH | HETTY | HUGH | IRIS |
| HEINZ | HEYWOOD | HUGO | IRL |
| HELAINE | HEZEKIAH | HULDA | IRMA |
| HELEN | HILARY | HULDAH | IRVIN |
| HELENA | HILDA | HUMPHREY | IRVING |
| HELENE | HILDE | HUNTINGTON | IRWIN |
| HELGA | HILDEGARD | HURSCHEL | ISAAC |
| HELMUT | HILDE-GARDE | HY | ISAAK |
| HELMUTH | HILDRED | HYACINTH | ISABEL |
| HELOISE | HILDUR | HYMAN | ISABELLA |
| HENDRIK | HILLARD | IAIN | ISABELLE |
| HENDRIKA | HILLARY | IAN | ISAC |
| HENNIE | HILLERY | ICHABOD | ISADOR |
| HENNY | HIRAM | IDA | ISADORA |
| HENRI | HIRSCH | IGGY | ISADORE |
| HENRIETA | HOBART | IGNATIUS | ISMAH |
| HENRIETTA | HOBERT | IGNATZ | ISHAM |
| HENRIETTE | HOLLEY | IGNAZ | ISHMAEL |
| HENRIK | HOLLI | IGOR | ISIAH |
| HENRY | HOLLIE | IKE | ISIDOR |
| ISIDORE | JAN | JEMIMA | JILLIAN |
| ISMAEL | JANA | JEMMA | JIM |
| ISOM | JANE | JEMMIE | JIMBO |
| ISRAEL | JANEEN | JEMMY | JIMME |
| ISTVAN | JANEL | JENNIE | JIMMIE |
| ITA | JANELL | JENNIFER | JIMMY |
| IVA | JANELLE | JENNY | JINNY |
| IVAN | JANET | JENS | JO |
| IVANA | JANICE | JERALD | JOAB |
| IVAR | JANIE | JERALDINE | JOACHIM |
| IVARS | JANINE | JERE | JOAN |
| IVETTE | JANIS | JEREMIAH | JOANN |
| IVEY | JANISE | JEREMIAS | JOANNA |
| IVIE | JANNA | JEREMY | JOANNE |
| IVO | JAQUELYN | JERI | JOB |
| IVONNE | JARED | JERIANE | JOCELYN |
| IVOR | JARRETT | JERIE | JOCILYN |
| IVORY | JARRYL | JERMAIN | JOCLYN |
| IVY | JARVIS | JERMAINE | JODI |
| IZAAK | JAS | JEROL | JODIE |
| IZZIE | JASMINE | JEROLD | JODY |
| IZZY | JASON | JEROME | JOE |
| JAC | JASPER | JERRALD | JOEL |
| JACK | JAY | JERRED | JOETTE |
| JACKI | JAYME | JERRELD | JOEY |
| JACKIE | JAYMEE | JERRELL | JOFFRE |
| JACKSON | JAYNE | JERRI | JOH |
| JACKY | JEAN | JERRIE | JOHANN |
| JACOB | JEANETTE | JERROLD | JOHANNES |
| JACOBUS | JEANIE | JERRY | JOHN |
| JACQUELIN | JEANNE | JERZY | JOHNIE |
| JACQUELINE | JEANNETTE | JESS | JOHNNA |
| JACQUELYN | JEANNJNE | JESSE | JOHNNIE |
| JACQUES | JEBEDIAH | JESSICA | JOHNNY |
| JADE | JED | JESSIE | JOJO |
| JAKE | JEDEDIAH | JETHRO | JOLENE |
| JAKOB | JEFEREY | JETTA | JON |
| JAMES | JEFF | JETTIE | JONAH |
| JAMEY | JEFFEREY | JEWEL | JONAS |
| JAMIE | JEFFIE | JEWELL | JONATHAN |
| JAMYE | JEFFREY | JILL | JONATHON |
| JONELL | JULIUS | KELSEY | KORNELIA |
| JOM | JUNE | KELVIN | KORNELIUS |
| JONNY | JUNEY | KEN | KRAIG |
| JORDAN | JUNIE | KENDALL | KRIS |
| JORDON | JUNIOR | KENDELL | KRISTA |
| JOSEA | JUNIUS | KENDRICK | KRISTEN |
| JOSELYN | JURGEN | KENNETH | KRISTI |

List E
Example of ENGLISH FIRST-NAME LIST
Copyright 1995
LEXIS-NEXIS, a Division of Reed Elsevier Inc.

| | | | |
|---|---|---|---|
| JOSEPH | JUSTEN | KENNY | KRISTIE |
| JOSEPHA | JUSTICE | KENT | KRISTIN |
| JOSEPHINE | JUSTIN | KERI | KRISTINE |
| JOSEY | JUSTINE | KERMIT | KRISTOFFER |
| JOSH | KALVIN | KERRIE | KRISTY |
| JOSHUA | KARA | KERRY | KURT |
| JOSIAH | KAREN | KERSTIN | KYLE |
| JOSIE | KARIN | KERVIN | KYM |
| JOY | KARL | KERWIN | LACEY |
| JOYCE | KARLA | KEVIN | LACIE |
| JOYCEANN | KAROLA | KIERSTEN | LACY |
| JOZEF | KASEY | KILIAN | LADON |
| JOZSEF | KASPAR | KILLIAN | LAINE |
| JUBAL | KASPER | KIM | LALAH |
| JUD | KATE | KIMBER | LAMAR |
| JUDAH | KATERINA | KIMBERLEE | LAMARTINE |
| JUDAS | KATEY | KIMBERLEIGH | LAMBERT |
| JUDD | KATHERINE | KIMBERLEY | LAMONT |
| JUDE | KATHERYN | KIMBERLY | LANA |
| JUDI | KATHLEEN | KIP | LANCE |
| JUDIE | KATHRYN | KIRBY | LANCELOT |
| JUDITH | KATHY | KIRK | LANE |
| JUDY | KATIE | KIRSTEN | LANSON |
| JULEE | KATY | KIRSTI | LARA |
| JULES | KAY | KIRSTIE | LARENE |
| JULIA | KAYE | KIRSTIN | LARONE |
| JULIAN | KAYLEEN | KIRSTY | LARRIS |
| JULIANE | KEENAN | KIT | LARRY |
| JULIANNE | KEISHA | KITTIE | LARS |
| JULIE | KEITH | KITTY | LASKA |
| JULIEN | KELLEY | KLAUS | LASLO |
| JULIENNE | KELLI | KONRAD | LASZLO |
| JULIET | KELLIE | KONSTANTINOS | LATIC |
| JULIETTE | KELLY | KOOS | LATIMER |
| LAUANNA | LELAH | LEVON | LISE |
| LAUNCIE | LELAND | LEW | LISSA |
| LAURA | LELIA | LEWELL | LIZ |
| LAUREE | LELIO | LEWIS | LIZA |
| LAUREL | LEMMY | LEXIE | LIZABETH |
| LAUREN | LEMUEL | LEXY | LIZZIE |
| LAURENCE | LEN | LIANE | LIZZY |
| LAURETA | LENA | LIBBIE | LLEWELLYN |
| LAURETTA | LENARD | LIBBY | LLOYD |
| LAURETTE | LENDEN | LIDA | LLOYDA |
| LAURI | LENETTE | LIEF | LOELLA |
| LAURIE | LENISE | LILA | LOGAN |
| LAURIEN | LENNIE | LILAC | LOIS |
| LAVELL | LENNY | LILAH | LOLA |
| LAVERA | LENORA | LILE | LOLETA |
| LAVERN | LENORE | LILIAN | LOLITA |
| LAVERNA | LENWOOD | LILIEN | LOLLIE |
| LAVERNE | LEO | LILITH | LOLLY |
| LAVINA | LEOLA | LILLIA | LON |
| LAVIMA | LEON | LILLIAN | LOM |
| LAVONNE | LEONA | LILLIE | LONNA |
| LAWRENCE | LEONARD | LILLY | LONME |
| LDA | LEONID | LILY | LONNY |
| LEA | LEONIDA | LIN | LONSO |
| LEAH | LEONIDAS | LINCOLN | LONZIE |
| LEANDER | LEONORA | LINDA | LONZO |
| LEANE | LEOPOLD | LINDSAY | LONZY |
| LEANN | LERA | LINDSEY | LORA |
| LEANNE | LEROY | LINK | LORAIN |
| LEATHA | LES | LINNEA | LORAINE |
| LEE | LESLIE | LINNIE | LORANE |
| LEEANN | LESTER | LINNY | LORAY |
| LEEANNE | LETA | LINROY | LORAYNE |
| LEENA | LETHA | LINUS | LOREEN |
| LEESA | LETICIA | LINVAL | LOREN |
| LEFFEL | LETITIA | LINWOOD | LORENA |
| LEFTY | LETTIE | LINZIE | LORENE |
| LEIF | LETTY | LINZY | LORETA |
| LEIGH | LEVERNE | LIONEL | LORETTA |
| LEILA | LEVERT | LISA | LORI |
| LEITH | LEVI | LISABETH | LORIN |
| LORNA | LUIGI | MADELENE | MANSEL |
| LORNE | LUKE | MADELINE | MARABEL |
| LORRAINE | LULA | MADELYN | MARC |
| LORRAYNE | LULAH | MADGE | MARCEL |
| LOTHAR | LULU | MADIE | MARCELIN |
| LOTTIE | LUMMIE | MADONNA | MARCELL |
| LOU | LUNA | MAE | MARCELLA |
| LOUELLA | LURLEEN | MAGDA | MARCELLE |
| LOUIE | LURLENE | MAGDALENA | MARCELLUS |
| LOUIS | LURLINE | MAGDALENE | MARCI |
| LOUISA | LUTHER | MAGDALINE | MARCIA |
| LOUISE | LUZ | MAGGIE | MARCIE |
| LOULA | LUZERNE | MAGGY | MARCUS |
| LOURETTA | LYDIA | MAGNUS | MARCY |
| LOVELL | LYLE | MAHALA | MARDA |
| LOVETTA | LYMAN | MAHALIA | MARGARET |
| LOVETTE | LYN | MAIA | MARGE |
| LOWELL | LYNDA | MAIBLE | MARGEAUX |
| LOY | LYNDON | MAIJA | MARGERY |
| LOYAL | LYNN | MAJOR | MARGI |
| LUANN | LYNNA | MAL | MARGIE |
| LUANNA | LYNNE | MALCOLM | MARGO |
| LUANNE | LYNNETTE | MALINDA | MARGOT |
| LUBY | LYNWOOD | MALISSA | MARGRET |
| LUCAS | LYSANDER | MALKA | MARGY |
| LUCIAN | M'LINDA | MALLORIE | MARIAM |
| LUCIE | MABEL | MALLORY | MARIAN |
| LUCIEN | MABELLE | MALORIE | MARIANN |
| LUCILE | MABLE | MALORY | MARIANNE |
| LUCILLA | MAC | MALYNDA | MARIBEL |
| LUCILLE | MACE | MAME | MARIBELLE |
| LUCINDA | MACIE | MAMIE | MARIBETH |
| LUCIUS | MACK | MANDEE | MARIE |
| LUCRETIA | MADALAINE | MANDI | MARIEL |
| LUCY | MADALEINE | MANDIE | MARIETTA |
| LUDLOW | MADALINE | MANDY | MARIETTE |
| LUDWIG | MADALYN | MANFRED | MARILEE |
| LUDWIK | MADDIE | MANICE | MARILYN |
| LUDY | MADDY | MANLEY | MARILYNN |
| LUELLA | MADELAINE | MANLY | MARINA |
| LUGENE | MADELEINE | MANNY | MARIO |
| MARION | MARYBETH | MEAGAN | MEYER |
| MARISSA | MARY-FRANCES | MEG | MIA |
| MARJUS | MARYLOU | MEGAN | MIATTA |
| MARJORIE | MASON | MEL | MICAH |
| MARJORY | MATE | MELANIE | MICHAEL |
| MARK | MATEY | MELANY | MICHEL |
| MARKEE | MATHEW | MELBA | MICHELE |
| MARKIE | MATHIAS | MELICENT | MICHELLE |
| MARKOS | MATHILDA | MELINDA | MICK |
| MARKUS | MATILDA | MELISSA | MICKEY |
| MARLA | MATT | MELLICENT | MICKIE |
| MARLENA | MATTHEW | MELODI | MICKY |
| MARLENE | MATTHIAS | MELODIE | MIDGE |
| MARLEY | MATTIE | MELODY | MIKAEL |
| MARLIN | MATTY | MELONIE | MIKAL |
| MARLON | MATTYE | MELONY | MIKE |
| MARMADUKE | MAUD | MELVA | MIKEAL |
| MARNEY | MAUDE | MELVIN | MILAN |
| MARNIE | MAURA | MELVYN | MILDRED |
| MARNY | MAUREEN | MELYNDA | MILES |
| MARSDEN | MAURENE | MENDEL | MILICENT |
| MARSHA | MAUREY | MERCEDEL | MILLARD |
| MARSHAL | MAURICE | MERCEDES | MILLICENT |
| MARSHALL | MAURIE | MERCY | MILLIE |
| MARTA | MAURINE | MEREDETH | MILLY |
| MARTEA | MAURY | MEREDITH | MILO |
| MARTHA | MAVIS | MERIDETH | MILT |
| MARTI | MAX | MERIDITH | MILTON |
| MARTICA | MAXCIE | MERISSA | MIMI |
| MARTIE | MAXCINE | MERLE | MINDY |
| MARTIKA | MAXIE | MERLIN | MINERVA |
| MARTILDA | MAXIM | MERLYN | MINNIE |

List E
Example of ENGLISH FIRST-NAME LIST
Copyright 1995
LEXIS-NEXIS, a Division of Reed Elsevier Inc.

| | | | |
|---|---|---|---|
| MARTIN | MAXI-MILIAN | MERREL | MIRANDA |
| MARTY | MAXI-MILLIAN | MERRELL | MIRIAM |
| MARV | MAXINE | MERRILL | MISSIE |
| MARVA | MAXWELL | MERRY | MISSY |
| MARVIN | MAY | MERVIN | MISTY |
| MARY | MAYBELLE | MERWIN | MITCH |
| MARYAM | MAYDA | MERWYN | MITCHEL |
| MARYANN | MAYME | MERYL | MITCHELL |
| MARYANNE | MAYNARD | META | MITZI |
| MOE | NAMIE | NEWEL | NORA |
| MOLLIE | NAN | NEWELL | NORAH |
| MOLLY | NANCI | NEWT | NORBERT |
| MONA | NANCIE | NEWTON | NOREEN |
| MONICA | NANCY | NICHAEL | NORM |
| MONIQUE | NANETTE | NICHOLM | NORMA |
| MONTE | NAM | NICHOLAS | NORMAL |
| MONTGOMERY | NANNETTE | NICK | NORMAN |
| MONTY | NANNI | NICKI | NORRIS |
| MONY | NANNIE | NICKIE | NORTON |
| MORDECAI | NANNY | NICKODEMUS | NORVAL |
| MOREY | NAOMA | NICKY | NUNZIO |
| MORGAN | NAOMI | NICODEMO | NYLE |
| MORGANA | NAPOLEON | NICODEMUS | OBADIAH |
| MORRIS | NAT | NICOL | OBED |
| MORT | NATALIE | NICOLA | OBEDIAH |
| MORTIMER | NATASHA | NICOLM | OCIE |
| MORTON | NATASSIA | NICOLAS | OCTAVE |
| MORTY | NATHAN | NICOLE | OCTAVIA |
| MOSE | NATHAMEL | NICOLETTE | ODEL |
| MOSES | NATWICK | NICOLLE | ODELL |
| MOZELLE | NAZARETH | NICOLO | ODESSA |
| MULLIGAN | NEAL | NIGEL | ODIE |
| MURIEL | NEALY | NIKA | ODIS |
| MURPHY | NED | NIKE | OGDEN |
| MURRAY | NEDINE | NIKI | OKTAVIA |
| MURRELL | NEIL | NIKITA | OLA |
| MURRY | NEILL | NIKITAS | OLAF |
| MYLES | NELDA | NIKKI | OLAN |
| MYNA | NELL | NILE | OLEG |
| MYRA | NELLE | NILES | OLEN |
| MYRAH | NELLIE | NILS | OLGA |
| MYRAL | NELLY | NIMROD | OLIN |
| MYREN | NELS | NINA | OLIVE |
| MYRNA | NELSON | NOAH | OLIVER |
| MYRON | NENA | NOE | OLIVIA |
| MYRTLE | NERO | NOEL | OLLEN |
| NADENE | NERSES | NOLA | OLLIE |
| NADIA | NESTOR | NOLAN | OLOF |
| NADINE | NETFIE | NONA | OMER |
| NADJA | NEVILLE | NONNIE | ONAL |
| ONEL | PAGE | PENNY | PRUDENCE |
| ONNIK | PAIGE | PER | PRUE |
| OPAL | PAM | PERCIVAL | PRUNELLA |
| OPEL | PAMELA | PERCY | QUEEN |
| OPHELIA | PANSY | PERRY | QUEENIE |
| OPRAH | PAOLO | PERSIS | QUEENY |
| ORA | PARL | PETE | QUENTIN |
| ORAL | PARNELL | PETER | QUINCY |
| ORAN | PARRY | PETRA | QUINNIE |
| OREN | PASCAL | PETRO | RACHEL |
| ORESTE | PASCHAL | PETROS | RACHELLE |
| ORIN | PASQUALE | PHEBE | RAE |
| ORLAN | PAT | PHEUM | RAIFORD |
| ORLEN | PATIENCE | PHIDIAS | RALPH |
| ORLIN | PATRICE | PHIL | RAMONA |
| ORLYN | PATRICIA | PHILBERT | RANDAL |
| ORPHA | PATRICK | PHILIP | RANDALL |
| ORSON | PATSY | PHILIPPE | RANDI |
| ORTON | PATTI | PHILLIP | RANDIE |
| ORTRUD | PATTIE | PHILO | RANDOLF |
| ORVAL | PATTY | PHINEAS | RANDOLPH |
| ORVID | PAUL | PHOEBE | RANDY |
| ORVIL | PAULA | PHYLLIS | RANSOM |
| ORVILLE | PAULETTE | PIA | RAPHAEL |
| OSBERT | PAULINA | PIER | RAQUEL |
| OSCAR | PAULINE | PIERCE | RAY |
| OSGOOD | PAVEL | PIERINA | RAYFORD |
| OSIE | PEARCE | PIERRE | RAYMOND |
| OSSIE | PEARL | PIERS | RBT |
| OSWALD | PEARLENE | PIETER | REAGAN |
| OTHA | PEARLIE | PIETRO | REBA |
| OTHIS | PEARLINE | PLATO | REBECCA |
| OTIS | PEARLY | POINDEXTER | RECTOR |
| OTTIS | PEDER | POLUE | REED |
| OTTO | PEG | POLLY | REGAN |
| OVE | PEGGI | PORTIA | REGGIE |
| OVETA | PEGGIE | PRECY | REGGY |
| OWEN | PEGGY | PRESTON | REGINA |
| OZZIE | PENELOPE | PRINCE | REGINALD |
| PADDIE | PENNI | PRINCESS | REGIS |
| PADDY | PENNIE | PRISCILLA | REID |
| REINHARDT | RIPLEY | RONNETTE | ROXIE |
| REINHOLD | RISA | RONNIE | ROXY |
| REMI | RITA | RONNY | ROY |
| REMO | RITCHIE | ROOSEVELT | ROYAL |
| REMUS | RITHA | RORY | ROYCE |
| RENA | ROB | ROSALEE | ROZALIA |
| RENATA | ROBBI | ROSALIA | ROZALIE |
| RENATE | ROBBIE | ROSALIE | RUBAN |
| RENE | ROBBIN | ROSALIND | RUBEN |
| RENEE | ROBBY | ROSALINDA | RUBENA |
| RETA | ROBERT | ROSALYN | RUBERT |
| RETHA | ROBERTA | ROSALYND | RUBEY |
| REUBAN | ROBIN | ROSAMOND | RUBIE |
| REUBEN | ROBINA | ROSAMONDE | RUBIN |
| REUBENA | ROBINETTE | ROSAMUND | RUBINA |
| REUBIN | ROBYN | ROSAMUNDE | RUBY |
| REUBINA | ROCCO | ROSANNA | RUBYE |
| REVA | ROCHELLE | ROSANNE | RUDDY |
| REX | ROCKY | ROSCOE | RUDOLF |
| REXFORD | ROD | ROSE | RUDOLPH |
| REY | RODDIE | ROSEANN | RUDY |
| REYNALD | RODERIC | ROSEANNE | RUE |
| REYNOLD | RODERICH | ROSEBUD | RUEBEN |
| RHEA | RODERICK | ROSELIN | RUFUS |
| RHINELANDER | RODGER | ROSELYN | RULOEF |
| RHODA | RODNEY | ROSEMARIE | RUPERT |
| RHONA | RODRICK | ROSEMARY | RUSS |
| RHONDA | ROGER | ROSEMUND | RUSSELL |
| RHYS | ROLAND | ROSEMUNDE | RUSTY |
| RICARD | ROLF | ROSENA | RUTH |
| RICH | ROLFE | ROSETTA | RUTHANNA |
| RICHARD | ROLLO | ROSIE | RUTHANNE |
| RICHELLE | ROMAN | ROSINA | RUTHIE |
| RICHIE | ROMEO | ROSLYN | RUTHLYN |
| RICK | ROMULUS | ROSS | RYAN |
| RICKEY | RON | ROSWELL | SABA |
| RICKI | RONA | ROSWITHA | SABINA |
| RICKIE | RONALD | ROULETTE | SABINE |
| RICKY | RONDA | ROWENA | SABRINA |
| RIKKI | RONDELL | ROWLAND | SADIE |
| RILEY | RONETTE | ROXANNE | SAL |
| SALLI | SHARI | SIDNEY | STACIE |
| SALLIE | SHARLENE | SIEGFRIED | STACY |
| SALLY | SHARON | SIG | STAN |
| SALLYE | SHARYN | SIGFRIED | STANISLAW |
| SALOMON | SHAUN | SIGMUND | STANLEY |
| SAM | SHAWN | SIGNE | STANLY |
| SAMANTHA | SHAWNA | SIGURD | STEFAN |
| SAMMIE | SHAYNE | SILAS | STEFFI |
| SAMMY | SHEARL | SILVIA | STELLA |
| SAMUAL | SHEBA | SILVIO | STEPHAN |
| SAMUEL | SHEENA | SIMEON | STEPHANIE |
| SANDI | SHEILA | SIMON | STEPHEN |
| SANDIE | SHELBY | SIMONE | STERLING |
| SANDRA | SHELDEN | SIMONNE | STEVE |
| SANDY | SHELDON | SISSIE | STEVEN |
| SANJA | SHELIA | SISSY | STEVIE |

List E
Example of ENGLISH FIRST-NAME LIST
Copyright 1995
LEXIS-NEXIS, a Division of Reed Elsevier Inc.

| | | | |
|---|---|---|---|
| SARA | SHELLEY | SKEET | STEWART |
| SARAH | SHELLY | SKIPPIE | STU |
| SAUL | SHELTON | SKIPPY | STUART |
| SCHUYLER | SHERI | SKYLER | SUANN |
| SCOT | SHERIDAN | SLIM | SUANNE |
| SCOTT | SHERIE | SMEDLEY | SUE |
| SCOTTIE | SHERILYN | SOFIE | SUELLEN |
| SCOTTY | SHERL | SOL | SUMNER |
| SEAMUS | SHERLE | SOLOMAN | SUNNIE |
| SEAN | SHERLEE | SOLOMON | SUNNY |
| SEBASTIAN | SHERMAN | SONDRA | SUSAN |
| SEFERINO | SHERON | SONIA | SUSANA |
| SELDEN | SHERREE | SONJA | SUSANNA |
| SELENA | SHERRI | SONNY | SUSANNAH |
| SELENE | SHERRIE | SONYA | SUSANNE |
| SELINA | SHERRY | SPARKY | SUSETTE |
| SELMA | SHERWIN | SPENCE | SUZAN |
| SELMER | SHERYL | SPENCER | SUZANNE |
| SERENA | SHIRL | SPENSER | SUZELLEN |
| SERINA | SHIRLE | SPIRO | SUZETTE |
| SETH | SHIRLEE | SPIROS | SUZI |
| SEYMORE | SHIRLEY | SPYROS | SUZIE |
| SEYMOUR | SI | STACEY | SUZY |
| SHANE | SIBYL | STACI | SVEN |
| SHANNON | SID | STACIA | SWEN |
| SY | TERRI | THURSTAN | TREVOR |
| SYBIL | TERRILL | THURSTON | TREY |
| SYD | TERRY | TIBOR | TRICIA |
| SYDNEY | TERRYL | TIFFANY | TRILBY |
| SYLVAN | TESS | TILLIE | TRINA |
| SYLVANUS | TESSIE | TILLY | TRISH |
| SYLVENE | TESSY | TIM | TRISTAM |
| SYLVESTER | TEX | TIMMY | TRISTAN |
| SYLVIA | THAD | TIMO | TRIXIE |
| SYLVIE | THADDEUS | TIMOTHY | TRIXY |
| SYLVINA | THADEUS | TINA | TROY |
| TABATHA | THARON | TINO | TRUDIE |
| TABITHA | THEA | TIPHANIE | TRUDY |
| TAD | THEDA | TIPHANY | TWALA |
| TAFFY | THEIMA | TITO | TWILA |
| TALLULAH | THELMA | TITUS | TWYLA |
| TAMARA | THEO | TOBIAS | TYCHO |
| TAMI | THEOBALD | TOBY | TYCHUS |
| TAMMI | THEODIS | TODD | TYCUS |
| TAMMIE | THEODOR | TOLLIE | TYRONE |
| TAMMY | THEODORA | TOLLIVER | UDIE |
| TANCRED | THEODORE | TOLLY | UDY |
| TAMA | THEODORIS | TOM | ULRICH |
| TANJA | THEODOSIA | TOMMIE | ULYSSES |
| TANYA | THEONE | TOMMY | UNA |
| TASHA | THEORA | TONEY | URA |
| TATE | THEOTIS | TOM | URBAIN |
| TATIANA | THERESA | TOMA | URIAS |
| TAUBA | THERESIA | TONY | URSULA |
| TED | THERESSA | TONYA | VACHEL |
| TEDD | THOM | TOOTIE | VADA |
| TEDDY | THOMAS | TOVE | VAL |
| TEE | THOMASINA | TRACEE | VALDA |
| TELMA | THOR | TRACEY | VALENTIN |
| TENA | THORA | TRACI | VALENTINE |
| TENCH | THORE | TRACIE | VALENTINO |
| TERENCE | THORNTON | TRACY | VALERIA |
| TERESA | THORVALD | TRAVER | VALERIE |
| TERRANCE | THOS | TRAVIS | VALTER |
| TERRELL | THURMAN | TRENA | VANCE |
| TERRENCE | THURMOND | TRENT | VANDER |
| VANDY | VINCENT | WAYMAN | WINNIFRED |
| VANBSSA | VINNIE | WAYNE | WINNY |
| VAUGHAN | VINNY | WELDEN | WINONA |
| VAUGHN | VIOLA | WELDON | WINSLOW |
| VEDA | VIOLET | WELLS | WINSTON |
| VELLA | VIRACE | WENDEL | WINTHROP |
| VELMA | VIRDA | WENDELL | WINTON |
| VELVA | VIRGIE | WENDI | WM |
| VEOLA | VIRGIL | WENDY | WOLFGANG |
| VERA | VIRGINIA | WERNER | WOODIE |
| VERDEEN | VIRGIMUS | WES | WOODROW |
| VERDELL | VITA | WESLEY | WOODRUFF |
| VERGA | VITINA | WESLIE | WOODY |
| VERGIL | VITINO | WESTLEY | WYATT |
| VERLIE | VITO | WHITNEY | WYLA |
| VERLIN | VITTORIA | WIDDIE | XAVIER |
| VERLON | VIVIAN | WILBER | XAVIERA |
| VERLYN | VIVIANNE | WILBERFORCE | YARDLEY |
| VERN | VIVIEN | WILBERT | YETTA |
| VERNA | VLAD | WILBUR | YOLANDA |
| VERNARD | VLADIMIR | WILDA | YOSEF |
| VERNE | VOL | WILEY | YVES |
| VERNEST | VON | WILFORD | YVETTB |
| VERNESTINE | VONDA | WILFRED | YVONNE |
| VERNICE | VONNA | WILHELM | ZACHARIA |
| VERNIE | WADE | WILHELMENA | ZACHARIAH |
| VERNON | WALDEMAR | WILHELMINA | ZACHARY |
| VERONICA | WALDO | WILHEMENA | ZACK |
| VERSA | WALDORF | WILHEMINA | ZALPH |
| VERSIE | WALLACE | WILLARD | ZANE |
| VI | WALLIE | WILLIAM | ZEB |
| VIC | WALLY | WILLIE | ZEBADIAH |
| VICKI | WALT | WILLIS | ZEBEDEE |
| VICKIE | WALTER | WILLMA | ZECHARIAH |
| VICKY | WANDA | WILLY | ZEF |
| VICTOR | WARD | WILMA | ZEFF |
| VICTORIA | WARREN | WILMAR | ZEKE |
| VIDAL | WASHINGTON | WILMOT | ZELDA |
| VIE | WAYLAN | WINFRED | ZELIA |
| VILMA | WAYLEN | WINIFRED | ZELIG |
| VINCE | WAYLON | WINNIE | ZELL |
| ZELLA | | | |
| ZELLE | | | |
| ZELMA | | | |
| ZENA | | | |
| ZENITH | | | |
| ZENO | | | |
| ZENOBIA | | | |
| ZENON | | | |
| ZEPHERY | | | |
| ZETA | | | |
| ZETTA | | | |
| ZEV | | | |
| ZILLA | | | |
| ZILLAH | | | |
| ZINA | | | |
| ZITA | | | |
| ZIVKO | | | |
| ZOE | | | |
| ZOLLIE | | | |
| ZOLLY | | | |
| ZORA | | | |
| ZULA | | | |
| ZYGMUND | | | |
| ZYGMUNT | | | |

Modifications and variations of the above-described embodiments of the present invention are possible, as appreciated by those skilled in the art in light of the above teachings. As mentioned, any of a variety of hardware systems, memory organizations, software platforms, and programming languages may embody the present invention without departing from its spirit and scope. Moreover, countless variations of the Partition List, company indicators, product names, organization indicators, English first name list, and resulting Phrase Lists, and the like, may be employed or produced while remaining within the scope of the invention. It is therefore to be understood that, within the scope of the appended claims and their equivalents, the invention may be practiced otherwise than as specifically described.

What is claimed is:

1. A computer-implemented method of processing a stream of document text to form a list of phrases that are indicative of conceptual content of the document, the phrases being used as index terms and search query terms in full text document searching performed after the phrase list is formed, the method comprising:

partitioning the document text into plural chunks of document text, each chunk being separated by at least one partition entity from a partition list; and selecting certain chunks as the phrases of the phrase list, based on frequencies of occurrence of the chunks within the stream of document text.

2. The method of claim 1, wherein the partitioning step includes:

scanning a portion of the document text stream;

comparing the scanned portion of the document text stream to partition entities in the partition list;

substituting a partition tag for portions of the document text stream which match a partition entity;

generating a text chunk list;

scanning the text chunk list to determine a frequency of each text chunk in the text chunk list; and revising the text chunk list to include the respective frequencies of occurrence in association with the text chunks.

3. The method of claim 1, wherein the selecting step includes:

selecting the certain chunks as the phrases of the phrase list based only on the frequencies of occurrence of the chunks within the stream of document text and on a quantity of words within the chunks.

4. The method of claim 1, wherein:

a) the partitioning step includes:
  a1) scanning a portion of the document text stream;
  a2) comparing the scanned portion of the document text stream to partition entities in the partition list;
  a3) substituting a partition tag for portions of the document text stream which match a partition entity;
  a4) generating a text chunk list;
  a5) scanning the text chunk list to determine a frequency of each text chunk in the text chunk list; and
  a6) revising the text chunk list to include the respective frequencies of occurrence in association with the text chunks; and b) the selecting step includes selecting the certain chunks as the phrases of the phrase list based only on the frequencies of occurrence of the chunks within the stream of document text and on a quantity of words within the chunks.

5. The method of claim 1, wherein the selecting step includes:

excluding a chunk from being determined as a phrase if the chunk is a single word beginning with a lower case letter.

6. The method of claim 1, wherein the selecting step includes:

determining a chunk as being a phrase if the chunk includes a plurality of words each constituting lower case letters only if the chunk occurs at least twice in the document text stream.

7. The method of claim 1, wherein the selecting step includes:

determining a chunk as being a proper name if the chunk includes a plurality of words each having at least a first letter which is upper case.

8. The method of claim 1, wherein the selecting step includes:

mapping a sub-phrase to a phrase.

9. The method of claim 1, wherein the selecting step includes:

mapping single upper case words to their respective proper names.

10. The method of claim 1, wherein the selecting step includes:

detecting presence of acronyms;

incrementing a count of a proper name corresponding to the respective detected acronyms; and copying the proper name and the acronym to an acronym list.

11. The method of claim 1, wherein the selecting step includes:

combining a phrase list of lower case words with a phrase list of proper names.

12. The method of claim 1, further comprising:

reducing the phrase list by consolidating phrases in the phrase list by using a synonym thesaurus.

13. The method of claim 1, further comprising:

adding phrases to the phrase list by combining phrases which are separated in the document text stream only by prepositions.

14. The method of claim 1, further comprising:

trimming the phrase list by eliminating phrases which occur in fewer than a threshold number of document text streams.

15. The method of claim 1, further comprising:

categorizing proper names in the proper name list into groups based on corresponding group lists.

16. An apparatus of processing a stream of document text to form a list of phrases that are indicative of conceptual content of the document, the phrases being used as index terms and search query terms in full text document searching performed after the phrase list is formed, the apparatus comprising:

means for partitioning the document text into plural chunks of document text, each chunk being separated by at least one partition entity from a partition list; and means for selecting certain chunks as the phrases of the phrase list, based on frequencies of occurrence of the chunks within the stream of document text.

17. The apparatus of claim 16, wherein the partitioning means includes:

means for scanning a portion of the document text stream;

means for comparing the scanned portion of the document text stream to partition entities in the partition list;

means for substituting a partition tag for portions of the document text stream which match a partition entity;

means for generating a text chunk list;

means for scanning the text chunk list to determine a frequency of each text chunk in the text chunk list; and means for revising the text chunk list to include the respective frequencies of occurrence in association with the text chunks.

18. The apparatus of claim 16, wherein the selecting means includes:

means for selecting the certain chunks as the phrases of the phrase list based only on the frequencies of occurrence of the chunks within the stream of document text and on a quantity of words within the chunks.

19. The apparatus of claim 16, wherein:
a) the partitioning means includes:
  a1) means for scanning a portion of the document text stream;
  a2) means for comparing the scanned portion of the document text stream to partition entities in the partition list;
  a3) means for substituting a partition tag for portions of the document text stream which match a partition entity;
  a4) means for generating a text chunk list;
  a5) means for scanning the text chunk list to determine a frequency of each text chunk in the text chunk list; and
  a6) means for revising the text chunk list to include the respective frequencies of occurrence in association with the text chunks; and
b) the selecting means includes means for selecting the certain chunks as the phrases of the phrase list based only on the frequencies of occurrence of the chunks within the stream of document text and on a quantity of words within the chunks.

20. A computer-readable memory which, when used in conjunction with a computer, can carry out a phrase recognition method to form a phrase list containing phrases that are indicative of conceptual content of a document, the phrases being used as index terms and search query terms in full-text document searching performed after the phrase list is formed, the computer-readable memory comprising:
computer-readable code for partitioning document text into plural chunks of document text, each chunk being separated by at least one partition entity from a partition list; and
computer-readable code for selecting certain chunks as the phrases of the phrase list based on frequencies of occurrence of the chunks within the stream of document text.

21. The computer-readable memory of claim 20, wherein the computer-readable code for partitioning includes:
computer-readable code for scanning a portion of the document text stream;
computer-readable code for comparing the scanned portion of the document text stream to partition entities in the partition list;
computer-readable code for substituting a partition tag for portions of the document text stream which match a partition entity;
computer-readable code for generating a text chunk list;
computer-readable code for scanning the text chunk list to determine a frequency of each text chunk in the text chunk list; and
computer-readable code for revising the text chunk list to include the respective frequencies of occurrence in association with the text chunks.

22. The computer-readable memory of claim 20, wherein the computer-readable code for selecting includes:
computer-readable code for selecting the certain chunks as the phrases of the phrase list based only on the frequencies of occurrence of the chunks within the stream of document text and on a quantity of words within the chunks.

23. The computer-readable memory of claim 20, wherein:
a) the computer-readable code for partitioning includes:
  a1) computer-readable code for scanning a portion of the document text stream;
  a2) computer-readable code for comparing the scanned portion of the document text stream to partition entities in the partition list;
  a3) computer-readable code for substituting a partition tag for portions of the document text stream which match a partition entity;
  a4) computer-readable code for generating a text chunk list;
  a5) computer-readable code for scanning the text chunk list to determine a frequency of each text chunk in the text chunk list; and
  a6) computer-readable code for revising the text chunk list to include the respective frequencies of occurrence in association with the text chunks; and
b) the computer-readable code for selecting includes computer-readable code for selecting the certain chunks as the phrases of the phrase list based only on the frequencies of occurrence of the chunks within the stream of document text and on a quantity of words within the chunks.

24. A computer-implemented method of full-text, on-line searching, the method comprising:
a) receiving and executing a search query to display at least one current document;
b) receiving a command to search for documents having similar conceptual content to the current document;
c) executing a phrase recognition process to extract phrases allowing full text searches for documents having similar conceptual content to the current document, the phrase recognition process including the steps of:
  c1) partitioning the document text into plural chunks of document text, each chunk being separated by at least one partition entity from a partition list; and
  c2) selecting certain chunks as the phrases, based on frequencies of occurrence of the chunks within the stream of document text; and
d) automatically forming a second search query based at least on the phrases determined in the phrase recognition process so as to allow automated searching for documents having similar conceptual content to the current document.

25. The method of claim 24, further comprising:
validating phrases recognized by the phrase recognition process against phrases in a phrase dictionary before automatically forming the second search query.

26. The method of claim 24, further comprising:
displaying an error message if less than a threshold number of phrases are recognized for the current document.

27. A computer-implemented method of forming a phrase list containing phrases that are indicative of conceptual content of each of a plurality of documents, which phrases are used as index terms or in document search queries formed after the phrase list is formed, the method comprising:
a) selecting document text from the plurality of documents;
b) executing a phrase recognition process including the steps of:
  b1) partitioning the document text into plural chunks of document text, each chunk being separated by at least one partition entity from a partition list; and
  b2) selecting certain chunks as the phrases, based on frequencies of occurrence of the chunks within the stream of document text; and c) forming the phrase list, wherein the phrase list includes:
 1) phrases extracted by the phrase recognition process; and
 2) respective frequencies of occurrence of the extracted phrases.

28. The method of 27, further comprising:

forming a modified phrase list having only those phrases whose respective frequencies of occurrence are greater than a threshold number of occurrences.

29. The method of 27, further comprising:

forming a phrase dictionary based on the phrase list formed in the forming step.

30. A computer-implemented method of forming phrase lists containing phrases that are indicative of conceptual content of documents, which phrases are used as index terms or in document search queries formed after the phrase list is formed, the method comprising a) selecting document text from a sampling of documents from among a larger collection of documents; and
 b) executing a phrase recognition process to extract phrases to form a phrase list for each document processed, the phrase recognition process including:
  b1) partitioning the document text into plural chunks of document text, each chunk being separated by at least one partition entity from a partition list; and
  b2) selecting certain chunks as the phrases of the phrase list based on frequencies of occurrence of the chunks within the stream of document text.

* * * * *